(12) United States Patent
Suzuta et al.

(10) Patent No.: US 8,920,959 B2
(45) Date of Patent: Dec. 30, 2014

(54) LITHIUM ION BATTERY OUTER COVER MATERIAL

(75) Inventors: Masayoshi Suzuta, Tokyo (JP); Takuya Muraki, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 91 days.

(21) Appl. No.: 13/818,135

(22) PCT Filed: Sep. 7, 2011

(86) PCT No.: PCT/JP2011/070393
§ 371 (c)(1),
(2), (4) Date: Feb. 21, 2013

(87) PCT Pub. No.: WO2012/033133
PCT Pub. Date: Mar. 15, 2012

(65) Prior Publication Data
US 2013/0149597 A1    Jun. 13, 2013

(30) Foreign Application Priority Data

Sep. 8, 2010   (JP) .................................. 2010-201079
Sep. 8, 2010   (JP) .................................. 2010-201080
Jul. 20, 2011   (JP) .................................. 2011-158849

(51) Int. Cl.
*H01M 2/18*       (2006.01)
*H01M 2/02*       (2006.01)
*H01M 10/0525*    (2010.01)

(52) U.S. Cl.
CPC ............ *H01M 2/024* (2013.01); *H01M 2/0287* (2013.01); *Y02T 10/7011* (2013.01); *H01M 2/02* (2013.01); *H01M 10/0525* (2013.01)
USPC ............ 429/141; 429/144; 429/163; 429/177

(58) Field of Classification Search
CPC ................................. H01M 2/00; H01M 10/00
USPC .................................. 429/141, 144, 163, 177
See application file for complete search history.

(56) References Cited

U.S. PATENT DOCUMENTS

2004/0142190 A1 *   7/2004   Kawai et al. .................. 428/461

FOREIGN PATENT DOCUMENTS

| CN | 101589488 | 11/2009 |
|----|-----------|---------|
| JP | 10-208708 | 8/1998 |

(Continued)

OTHER PUBLICATIONS

Japanese Notice of Allowance mailed Jan. 14, 2014 in corresponding Japanese Application No. 2013-202756 X.

(Continued)

*Primary Examiner* — Patrick Ryan
*Assistant Examiner* — Ben Lewis

(57) ABSTRACT

According to the present invention, a lithium ion battery outer cover material that has superior resistance to electrolytes without chromate treatment, has superior deep drawing formability and high quality, and can be produced easily is provided. The lithium ion battery outer cover material (1) of a first embodiment of the present invention has a base material layer (11), first adhesive layer (12) containing an adhesive, aluminum foil layer (13), corrosion prevention treated layer (14), second adhesive layer (15) containing an adhesive or adhesive resin, and sealant layer (16) laminated in that order. The base material layer (11) is a film base material in which the difference ($\alpha 2-\alpha 1$) of the elasticity ($\alpha 1$) to the yield point and the elasticity ($\alpha 2$) to the rupture point as measured according to JIS-K7127 is 100% or greater in at least one of the MD direction and TD direction.

17 Claims, 2 Drawing Sheets

(56) References Cited

FOREIGN PATENT DOCUMENTS

| | | |
|---|---|---|
| JP | 2000-212764 | 8/2000 |
| JP | 2001-176458 | 6/2001 |
| JP | 2002-56824 | 2/2002 |
| JP | 3567230 | 6/2004 |
| JP | 2004-291635 | 10/2004 |
| JP | 2004-319414 | 11/2004 |
| JP | 2004-362953 | 12/2004 |
| JP | 2005-288996 | 10/2005 |
| JP | 2006-236938 | 9/2006 |
| JP | 2006-331897 | 12/2006 |
| JP | 2008-53133 | 3/2008 |
| JP | 2008-130436 | 6/2008 |
| JP | 2009-59709 | 3/2009 |
| JP | 4422171 | 12/2009 |
| JP | 4431822 | 1/2010 |
| JP | 2011-175841 | 9/2011 |
| JP | 2012-33394 | 2/2012 |
| WO | WO 2004/108408 A1 | 12/2004 |

OTHER PUBLICATIONS

International Search Report of Corresponding PCT Application PCT/JP2011/070393 mailed Dec. 6, 2011.

Chinese Office Action issued Aug. 27, 2014 in corresponding Chinese Patent Application No. 201180042862.5.

\* cited by examiner

LITHIUM ION BATTERY OUTER COVER MATERIAL

CROSS-REFERENCE TO RELATED APPLICATIONS

This application is a U.S. national stage application of PCT/JP2011/070393 filed Sep. 7, 2011 and claims the foreign priority benefit of Japanese Application No. 2010-201079 filed Sep. 8, 2010, Japanese Application No. 2010-201080 filed Sep. 8, 2010, and Japanese Application No. 2011-158849 filed Jul. 20, 2011, in the Japanese Intellectual Property Office, the contents of all of which are incorporated herein by reference.

TECHNICAL FIELD

The present invention relates to an outer cover material for a lithium ion battery.

BACKGROUND ART

Lithium ion secondary batteries (to also be referred to as "lithium ion batteries") are being actively developed for consumer applications used in portable terminal devices such as cell phones as well as video cameras and the like due to their high energy output despite their extremely thin shape and compact size. Metal enclosure types have conventionally been used for the outer cover materials of lithium ion batteries. However, deep-drawn formed products obtained by cold forming a laminated film having a multilayer configuration (employing, for example, a configuration consisting of a base material layer having heat resistance, an aluminum foil layer and a sealant (heat-fusible film) layer) (to also be simply referred to as "deep-drawn formed products") have come to be used in recent years due to their advantages of being lightweight and allowing greater freedom in the selection of battery shape. In addition to offering the aforementioned advantages, these deep-drawn formed products are also advantageous in terms of having high heat dissipation and low cost, and studies are being conducted on their application to the batteries of environmentally-friendly hybrid vehicles and electric vehicles.

A lithium ion battery that uses the aforementioned laminated film is formed by housing battery body components in the form of a positive electrode material, a negative electrode material and a separator in a deep-drawn formed product together with an electrolytic solution, obtained by dissolving a lithium salt in an aprotic solvent such as propylene carbonate, ethylene carbonate, dimethyl carbonate, diethyl carbonate or ethylmethyl carbonate, or an electrolyte layer composed of a polymer gel impregnated with that electrolytic solution, followed by encapsulating by heat sealing.

The aforementioned electrolytic solution is highly permeable with respect to sealant layers composed of a heat-fusible film. If the electrolytic solution penetrates into the sealant layer, the penetrated electrolytic solution lowers lamination strength between the aluminum foil layer and the sealant layer and the electrolytic solution may ultimately leak to the outside. In addition, examples of lithium salts serving as electrolytes include lithium salts such as $LiPF_6$ and $LiBF_4$. However, if moisture penetrates into a deep-drawn formed product, the lithium salt ends up being hydrolyzed resulting in the formation of hydrofluoric acid, thereby causing corrosion of metal surfaces and a decrease in lamination strength between each layer of the multilayer film.

In this manner, an outer cover material for a lithium ion battery having a multilayer configuration in the manner of a laminated film is required to inhibit corrosion of metal foil (aluminum foil) and a decrease in lamination strength between each layer caused by the electrolytic solution. In addition, the outer cover material is also required to be resistant to electrolytic solution and hydrofluoric acid.

Chromate treatment, that uses hexavalent chromium and is carried out on the surface of the aluminum foil layer, has been conventionally used as a method for enhancing adhesion between the aluminum foil layer and a base material layer in outer cover materials for lithium ion batteries. However, hexavalent chromium has been treated as an environmentally hazardous substance in recent years as in the Rohs and REACH regulations in Europe. Consequently, trivalent chromium has come to be used in chromate treatment. However, in this method, a hexavalent chromium treatment layer is formed by using trivalent chromium as a starting substance. Since there is the possibility of the complete discontinuation of the use of chromium in the future, and in consideration of applications to electric vehicles designed on the basis of environmental considerations in particular, it is important to develop a method that enhances corrosion prevention performance against electrolytic solutions and hydrofluoric acid with a treatment that does not use chromium compounds.

On the other hand, the size of lithium ion batteries can be reduced due to their high energy density. The magnitude of the energy density of a lithium ion battery is determined by the extent to which cells and electrolytic solution can be contained in a single battery, and the contained amounts thereof are determined by the forming depth when forming an outer cover material for a lithium ion battery and obtaining a deep-drawn formed product. Although drawing is typically carried out with a metal mold, if the forming depth is too deep, cracks and pinholes may form in those portions of the lithium battery outer cover material that are drawn by forming, thereby resulting in a loss of reliability of the battery. Consequently, in order to realize both battery high reliability and high energy density, lithium battery outer cover materials are required to have superior deep-drawing formability. In the case of applying a lithium ion battery to an electrical vehicle and the like in particular, although there is a desire to extract a large amount of current, since it is also desired to obtain superior long-term storage stability, further improvement of deep-drawing formability is required.

The following have been indicated as outer cover materials having enhanced deep-drawing formability.

(i) An outer cover material that uses for the base material layer thereof a drawn film having specific tensile strength and elasticity in the four directions of 0° C., 45°, 90° and 135° relative to the direction of drawing, and having little directivity of mechanical properties (Patent Document 1).

(ii) An outer cover material that uses for the base material layer thereof a heat-resistant resin film having impact strength of 30000 J/m or more (Patent Document 2).

(iii) An outer cover material that uses for the base material layer thereof a biaxially drawn polyamide film having density of 1142 $kg/cm^3$ to 1146 $kg/cm^3$ (Patent Document 3).

(iv) An outer cover material that uses as a base material layer thereof a heat-resistant resin drawn film having a shrinkage factor of 2% to 20% (Patent Document 4).

In addition, outer cover materials are also required to have superior moldability. In other words, since energy density is determined by the extent to which cells and electrolytic solution can be housed in a lithium battery, in order to further increase the housed amounts thereof, it is necessary to be able to increase the molding depth when molding the outer cover material into the shape of the battery.

Although molding of outer cover materials is typically carried out by drawing using a metal mold, if the molding depth at this time is excessively deep, cracks and pinholes may form in those portions that are drawn by molding, thereby resulting in a loss of battery reliability. Consequently, it is important to be able to increase molding depth without losing reliability.

In large-scale applications such as electric vehicles in particular, although there is a desire to further increase energy density in terms of battery performance with respect to the desire to extract a large current, superior reliability and long-term storage stability in particular are also simultaneously required.

Various outer cover materials are known that demonstrate improved moldability, examples of which include those using for the base material layer thereof a biaxially drawn polyamide film having superior kinetic coefficient of friction for the surface of the base material layer, rupture strength, elasticity to rupture point, shrinkage factor, impact strength, density or refractive index (Patent Documents 2, 4 and 5 to 10). However, further improvement of outer cover material moldability is required in large-scale applications in particular.

PRIOR ART DOCUMENTS

Patent Documents

Patent Document 1: Japanese Patent Publication No. 3567230

Patent Document 2: Japanese Patent Publication No. 4431822

Patent Document 3: Japanese Patent Publication No. 4422171

Patent Document 4: Japanese Unexamined Patent Application, First Publication No. 2006-331897

Patent Document 5: Japanese Unexamined Patent Application, First Publication No. 2002-56824

Patent Document 6: Japanese Unexamined Patent Application, First Publication No. 2006-236938

Patent Document 7: Japanese Unexamined Patent Application, First Publication No. 2008-53133

Patent Document 8: Japanese Unexamined Patent Application, First Publication No. 2008-130436

Patent Document 9: Japanese Patent Publication No. 4422171

Patent Document 10: Japanese Unexamined Patent Application, First Publication No. 2009-59709

SUMMARY OF THE INVENTION

Problems to be Solved by the Invention

However, the production of a drawn film having little direction of mechanical properties used in the outer cover material of (i) above is limited to the use of inflation molding, and there are restrictions on the film production method such as being unable to produce a film by casting. In addition, in the case of the heat-resistant resin film used in the outer cover material of (ii) above, since commercially available drawn polyamide resin films typically have impact strength of 30000 J/m or more, there is no guarantee that an outer cover material using this film having high impact strength will allow the obtaining of superior deep-drawing formability. In addition, the outer cover material of (iii) above may also be unable to obtain superior deep-drawing formability. In addition, in the outer cover material of (iv) above, it is necessary that the heat shrinkage factor of the heat-resistant resin film be large in order to achieve superior deep-drawing formability, and there is the risk of the occurrence of curling and the like when heat is applied in the baking step and the like during the course of battery production.

An object of the present invention is to provide a lithium ion battery outer cover material that has adequate electrolyte resistance without carrying out chromate treatment, superior deep-drawing formability and high quality, can be easily produced and has superior productivity. In addition, an object of the present invention is to provide a lithium ion battery outer cover material having superior moldability.

Means for Solving the Problems

The present invention employs the following configurations to solve the aforementioned problems.

[1] A lithium ion battery outer cover material, comprising sequentially laminating onto one side of a base material layer (SB) a first adhesive layer (AD-1) containing an adhesive, an aluminum foil layer (AL) provided with a corrosion prevention treated layer (CL) on at least one side thereof, a second adhesive layer (AD-2) containing an adhesive or adhesive resin, and a sealant layer (SL); wherein, the base material layer (SB) has a film base material (A) as indicated below:

film base material (A): film base material in which the difference ($\alpha 2 - \alpha 1$) between elasticity to the yield point ($\alpha 1$) and elasticity to the rupture point ($\alpha 2$) as measured according to JIS-K7127 is 100% or more in at least one of the MD direction and TD direction.

[2] The lithium ion battery outer cover material described in [1], wherein stress at the rupture point of the film base material (A) as measured according to JIS-K7127 is 100 MPa or more.

[3] The lithium ion battery outer cover material described in [1] or [2], wherein the film base material (A) is a biaxially drawn film base material composed of a resin composition (a1), obtained by blending an ethylene-based copolymer resin obtained by copolymerizing maleic anhydride with a polyamide resin, or a resin composition (a2), obtained by blending an aliphatic polyester with a polyamide resin.

[4] The lithium ion battery outer cover material described in [3], wherein the ethylene-based copolymer obtained by copolymerizing maleic anhydride is an ethylene-$\alpha,\beta$-unsaturated carboxylic acid alkyl ester-maleic anhydride copolymer.

[5] The lithium ion battery outer cover material described in [3], wherein the aliphatic polyester is polycaprolactone.

[6] The lithium ion battery outer cover material described in any of [3] to [5], wherein the polyamide resin is Nylon 6 or Nylon 66.

[7] A lithium ion battery outer cover material, comprising sequentially laminating on one side of a base material layer (SB) a first adhesive layer (AD-1) containing an adhesive, an aluminum foil layer (AL) provided with a corrosion prevention treated layer (CL) on at least one side thereof, a second adhesive layer (AD-2) containing an adhesive or adhesive resin, and a sealant layer (SL); wherein, the base material layer (SB) has a film base material (A) as indicated below:

film base material (A): drawn polyamide film base material in which elasticity to the rupture point x (units: %) and tensile stress at the rupture point y (units: MPa) as measured according to JIS-K7127 satisfy the relationships represented by the following formulas (1) and (2).

$$y \geq -2x+460 \quad (1)$$

$$y \geq 200 \quad (2)$$

[8] A lithium ion battery outer cover material, comprising sequentially laminating on at least one side of a base material layer (SB) a first adhesive layer (AD-1) formed by an adhesive, an aluminum foil layer (AL) provided with a corrosion prevention treated layer (CL) on at least one side thereof, a second adhesive layer (AD-2) formed by an adhesive resin or adhesive, and a sealant layer (SL); wherein, the base material layer (SB) is a drawn polyamide film in which the ratio $\gamma d/\gamma$ of a dispersive component of surface free energy $\gamma d$ to surface free energy $\gamma$ is 80% or less.

[9] The lithium ion battery outer cover material described in [8], wherein the dispersive component of surface free energy yd of the drawn polyamide film is 40 mN/m or less.

[10] The lithium ion battery outer cover material described in [8] or [9], wherein the contact angle when α-bromonaphthalene is dropped onto the surface of the drawn polyamide film is 20° or more.

[11] The lithium ion battery outer cover material described in any of [8] to [10], wherein the drawn polyamide film is a biaxially drawn polyamide film.

Effects of the Invention

The lithium ion battery outer cover material of the present invention has adequate resistance to electrolytic solution without carrying out chromate treatment, has superior deep-drawing formability and high quality, can be produced easily, and has superior productivity. In addition, the lithium ion battery outer cover material of the present invention has superior moldability.

EMBODIMENTS OF THE INVENTION

The following provides a detailed explanation of an embodiment 1 of the present invention, which is an example of an embodiment of the lithium ion battery outer cover material (to also be simply referred to as the "outer cover material") of the present invention.

Figure 1:
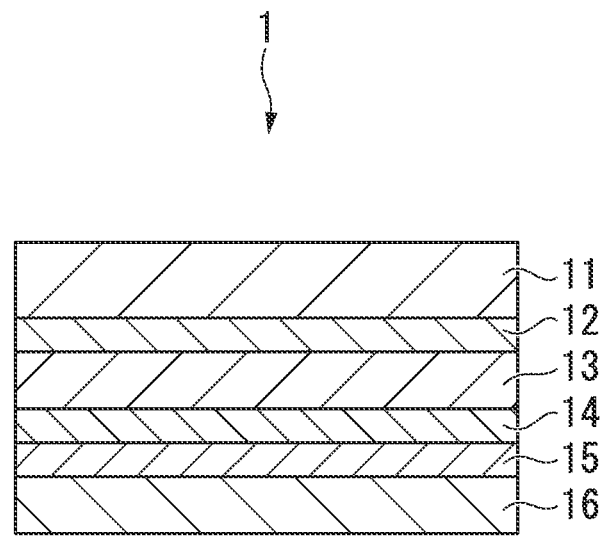
FIG. 1 is a cross-sectional view showing an example of the lithium ion battery outer cover material of the present invention.

As shown in FIG. 1, an outer cover material 1 of the present embodiment is a laminate obtained by sequentially laminating on one side of a base material layer 11 a first adhesive layer 12, an aluminum foil layer 13 provided with a corrosion prevention treated layer 14 on the opposite side from the base material layer 11, a second adhesive layer 15, and a sealant layer 16.

(Base Material Layer 11)

The base material layer 11 is a layer having a film base material (A) as indicated below.

Film base material (A): Film base material in which the difference ($\alpha 2-\alpha 1$) between elasticity to the yield point ($\alpha 1$) and elasticity to the rupture point ($\alpha 2$) as measured according to JIS-K7127 is 100% or more in at least one of the MD direction and TD direction.

In other words, the film base material (A) is a film base material in which the drawn length from the time the yield point is reached until the time the rupture point is reached is equal to or greater than the length when in the undrawn state in an evaluation of tensile strain properties measured according to JIS-K7127.

The film base material (A) may be a film base material in which the aforementioned difference ($\alpha 2-\alpha 1$) for the MD direction only is 100% or more, a film base material in which the aforementioned difference ($\alpha 2-\alpha 1$) for the TD direction only is 100% or more, or a film base material in which the aforementioned difference ($\alpha 2-\alpha 1$) in both the MD direction and TD direction is 100% or more.

As a result of conducing extensive studies, the inventor of the present invention found that, since a film base material of a base material layer is drawn while undergoing plastic deformation during cold forming of an outer cover material, elasticity properties from the yield point to the rupture point, which is when deformation switches from the elastic deformation region to the plastic deformation region, was found to be extremely important when evaluating tensile properties of the film base material. (Incidentally, the elasticity property described in Patent Document 1 refers to elasticity in a combined deformation region in which an elastic deformation region and a plastic deformation region are combined.)

The film base material (A) has superior tenacity as a result of the aforementioned difference in elasticity ($\alpha 2-\alpha 1$) being 100% or more in at least one direction of the MD direction and TD direction. Consequently, deep-drawing formability of the outer cover material 1 is improved by using the film base material (A) in the base material layer 11. The aforementioned difference in elasticity ($\alpha 2-\alpha 1$) of the film base material (A) is preferably 120% or more.

In addition, stress at the rupture point of the film base material (A) as measured according to JIS-K7127 is preferably 100 MPa or more and more preferably 200 MPa or more from the viewpoint of improving forming draw depth.

The aforementioned difference inelasticity ($\alpha 2-\alpha 1$) of the film base material (A) can be adjusted by suitably designing the material of the film base material (A).

The material of the film base material (A) is preferably a resin composition (a1), obtained by blending an ethylene-based copolymer resin obtained by copolymerizing maleic anhydride with a polyamide resin, or a resin composition ($\alpha 2$), obtained by blending an aliphatic polyester with a polyamide resin. In this manner, a resin composition is preferable that is obtained by blending a component that has a softer consistency and has superior compatibility as compared with the polyamide resin with the polyamide resin serving as the main component of the film base material (A).

The polyamide resin is a thermoplastic polymer compound having an amide bond (—CONH—) in a molecule thereof. There are no particular limitations on the polyamide resin, and it is preferably a polyamide resin having oriented crystallization.

Specific examples include poly-ε-capramide (Nylon 6), polyhexamethylene adipamide (Nylon 66), polyhexamethylene sebacamide (Nylon 610), polyaminoundecamide (Nylon 11), polylaurylamide (Nylon 12), polymetaxylene diadipamide (MXD6) and copolymers thereof. Nylon 6 and Nylon 66 are used particularly preferably for the polyamide resin.

An ethylene-α,β-unsaturated carboxylic acid alkyl ester-maleic anhydride copolymer (to also be referred to as "copolymer (a11)" is preferably used for the ethylene-based copolymer resin obtained by copolymerizing maleic anhydride that is blended with polyamide resin in the resin composition (a1).

An ester of an α,β-unsaturated carboxylic acid having an alkyl group having 1 to 4 carbon atoms is preferably used for the α,β-unsaturated carboxylic acid alkyl ester. A monocarboxylic acid or dicarboxylic acid having 3 to 8 carbon atoms is preferably used for the α,β-unsaturated carboxylic acid, and a metal salt or acid anhydride thereof may also be used. Specific examples include acrylic acid, methacrylic acid, maleic acid, fumaric acid, itaconic acid and maleic anhydride.

Methyl acrylate, ethyl acrylate, butyl acrylate, methyl methacrylate, ethyl methacrylate or butyl methacrylate is preferably used for the α,β-unsaturated carboxylic acid alkyl ester.

The ratio of the α,β-unsaturated carboxylic acid alkyl ester to the total amount of monomer used to polymerize the copolymer (a11) is preferably 4.9% by weight to 40% by weight and more preferably 10% by weight to 35% by weight. If the ratio of the α,β-unsaturated carboxylic acid alkyl ester it equal to or greater than the lower limit of the aforementioned ranges, the soft consistency of the copolymer (a11) is improved and the effect of modifying the strength properties of the film base material (A) that uses the resin composition (a1) is easily obtained. If the ratio of the α,β-unsaturated carboxylic acid alkyl ester is equal to or less than the upper limit of the aforementioned ranges, production of the copolymer (a11) becomes easy.

The ratio of maleic anhydride to the total amount of monomer used to polymerize the copolymer (a11) is preferably 0.1% by weight to 10% by weight and more preferably 0.5% by weight to 5% by weight. If the ratio of maleic anhydride is equal to or greater than the lower limit of the aforementioned ranges, compatibility between the polyamide resin and copolymer (a11) improves. If the ratio of maleic anhydride is equal to or less than the upper limit of the aforementioned ranges, processability of the resin composition (a1) improves.

A specific example of the copolymer (a11) is Rexpearl ET manufactured by Japan Polyethylene Corp.

The blending ratio of the ethylene-based copolymer resin obtained by copolymerizing maleic anhydride in the resin composition (a1) is preferably 0.1% by weight to 5% by weight and more preferably 0.5% by weight to 3% by weight based on 100% by weight of the polyamide resin. If the aforementioned blending ratio is equal to or greater than the lower limit of the aforementioned ranges, the effect of modifying the strength properties of the film base material (A) by the polyamide resin is easily obtained. In addition, if the aforementioned blending ratio is equal to or less than the upper limit of the aforementioned ranges, economy improves. Furthermore, there is hardly any change in performance even if the aforementioned blending ratio exceeds 5% by weight.

Polycaprolactone is preferable for the aliphatic polyester blended with the polyamide resin in the resin composition (a2). Polycaprolactone is a linear polyester compound composed of repeating units represented by —(CH$_2$)$_5$—COO— that is obtained by ring-opening polymerization of ε-caprolactone.

The molecular weight of polycaprolactone is preferably 5,000 to 100,000 and more preferably 10,000 to 70,000. If the molecular weight of polycaprolactone is equal to or greater than the lower limit of the aforementioned ranges, the effect of modifying the strength properties of the film base material (A) that uses the resin composition (a2) is easily obtained. If the molecular weight of polycaprolactone is equal to or less than the upper limit of the aforementioned ranges, strength properties of the film base material (A) improve.

A specific example of polycaprolactone is Plaxel manufactured by Daicel Chemical Industries Ltd.

The blending ratio of aliphatic polyester in the resin composition (a2) is preferably 0.1% by weight to 5% by weight and more preferably 0.5% by weight to 3% by weight based on 100% by weight of the polyamide resin. If the aforementioned blending ratio is equal to or greater than the lower limit of the aforementioned ranges, the effect of modifying the strength properties of the film base material (A) by the polyamide resin is easily obtained. In addition, if the aforementioned blending ratio is equal to or less than the upper limit of the aforementioned ranges, economy improves. Furthermore, there is hardly any improvement in performance even if the aforementioned blending ratio exceeds 5% by weight.

In addition, the aforementioned difference in elasticity (α2−α1) of the film base material (A) can be adjusted other than by suitably designing the material thereof as previously described. For example, the film base material (A) in which the aforementioned difference in elasticity (α2−α1) is 100% or more is obtained by biaxial drawing while controlling the drawing method (sequential biaxial drawing or simultaneous biaxial drawing), draw ratio and heat fixation temperature. In the case of obtaining the film base material (A) by this method, a polyamide resin may be used alone for the material of the film base material (A).

An example of a method is described below.

The aforementioned resin composition (a1) or resin composition (a2), obtained in the form of a polyamide resin alone, a dry blend or a melt blend, is formed into a film by extruding and melting with an extruder equipped with a T die. Next, an undrawn film base material is obtained by rapid-cooling deposition of the molten resin formed into a film on a rotating cooling drum by a known casting method such as air knife casting or electrostatic casting. Next, the undrawn film base material is preheated by a roller-type vertical drawing machine composed of a group of heating rollers having different peripheral velocities, and the undrawn film base material is drawn vertically between drawing rollers heated to a temperature equal to or higher than the glass transition temperature of the undrawn film base material and cold rollers for cooling the film. Moreover, the vertically drawn film base material is then led to a tender, and after preheating to 50° C. to 70° C., is drawn horizontally at 60° C. to 110° C. to obtain the film base material (A).

In addition, the ratio of the vertical draw ratio and horizontal draw ratio may be adjusted, and heat treatment and relaxation treatment may be further carried out at 210° C. to 220° C. in the tender as necessary.

In addition, drawing may be uniaxial drawing or biaxial drawing. Biaxial drawing is not only limited to sequential biaxial drawing, but may also be simultaneous biaxial drawing.

Although a biaxially drawn film base material composed of the resin composition (a1) or the resin composition (a2) is particularly preferable for the film base material (A), a biaxially drawn film is also used preferably that has been obtained by using a biaxial drawing method in which the drawing method (sequential biaxial drawing or simultaneous biaxial drawing), draw ratio and heat fixation temperature have been controlled.

Specific examples of the film base material (A) in which the aforementioned difference in elasticity (α2−α1) is made to be 100% or more by drawing include ON-U manufactured by Unitika Ltd. (biaxially drawn polyamide resin) and SNR manufactured by Mitsubishi Plastics Inc. (biaxially drawn polyamide film). In addition, an example of the film base material (A) in which the aforementioned difference in elasticity ($\alpha 2-\alpha 1$) has been made to be 100% or more by designing the material of the resin composition (a1) or the resin composition (a2) as previously described is ON-P manufactured by Unitika Ltd. (biaxially drawn polyamide film).

The thickness of the film base material (A) is preferably 6 μm or more and more preferably 10 μm or more from the viewpoint of improving pinhole resistance and insulating properties. In addition, the thickness of the film base material (A) is preferably 50 μm or less and more preferably 25 μm or less from the viewpoint of deep-drawing formability of the outer cover material 1.

Various types of additives such as a lubricant, antistatic agent, anti-blocking agent or inorganic fine particles may be added to the film base material (A) as necessary within a range that does not have a detrimental effect on film performance.

The method used to produce the film base material (A) is not limited to T-die casting as previously described, but rather may also be inflation molding and the like.

The base material layer 11 may be a layer composed of the film base material (A) alone, or may be a layer composed of a multilayer film obtained by laminating the film base material (A) with other film base materials.

Examples of other film base materials include polyester film, polyolefin film, polycarbonate film and fluororesin-based film.

Laminating other film base materials makes it possible to impart performance not able to be obtained with the polyamide film of the base material film (A) alone. For example, scratch resistance, acid resistance and electrolyte resistance are improved by a polyester film base material such as polyethylene terephthalate.

In addition, the film base material (A) used in the base material layer 11 or a laminated film of the film base material (A) and other film base materials may be provided with a coating layer obtained by coating with an acrylic, urethane, polyvinylidene chloride (including copolymer types), epoxy or polyester-based coating agent using various coating methods.

The thickness of the coating layer is preferably 0.1 μm to 5 μm.

(First Adhesive Layer 12)

The first adhesive layer 12 is a layer that adheres the base material layer 11 to the aluminum foil layer 13. A polyurethane-based adhesive, in which a polyisocyanate compound having two or more functional groups is allowed to act on a primary agent such as a polyester polyol, polyether polyol, acrylic polyol or carbonate polyol, is used preferably for the adhesive that composes the first adhesive layer 12.

An example of a polyester polyol is that obtained by polymerizing a dibasic acid and a diol compound.

Examples of the aforementioned dibasic acid include aliphatic dibasic acids such as succinic acid, glutaric acid, adipic acid, pimelic acid, suberic acid, azelaic acid, sebacic acid or brazilic acid, and aromatic dibasic acids such as isophthalic acid, terephthalic acid or naphthalene dicarboxylic acid. One type of these dibasic acids may be used alone or two or more types may be used in combination.

Examples of the aforementioned diol compounds include aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol, and aromatic diols such as xylylene glycol. One type of these diol compounds may be used alone or two or more types may be used in combination.

In addition, polyester urethane polyols in which hydroxyl groups on both ends of the aforementioned polyester polyol have undergone chain elongation by a polyisocyanate compound may be used for the polyester polyol.

Examples of the aforementioned polyisocyanate compound include 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidene dicyclohexyl-4,4'-diisocyanate. In addition, these isocyanate compounds may be used alone or may be used in the form of an adduct, biuret or isocyanurate composed of these isocyanate compounds.

One type of these polyisocyanate compounds may be used alone or two or more types may be used in combination.

Examples of polyether polyols include ether-based polyols such as polyethylene glycol or polypropylene glycol. In addition, polyether urethane polyols obtained by chain elongation of these ether-based polyols by the aforementioned isocyanate compounds may also be used.

Examples of acrylic polyols include copolymers having poly(meth)acrylic acid for the main component thereof. Examples of components that copolymerize with (meth) acrylic acid include hydroxyl group-containing monomers such as 2-hydroxyethyl (meth)acrylate or 2-hydroxypropyl (meth)acrylate, alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth) acrylamide, N-alkyl (meth)acrylamide, N,N-dialkyl (meth) acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy (meth)acrylamide, N,N-dialkoxy (meth)acrylamide (of which examples of alkoxy groups include a methoxy group, ethoxy group, butoxy group and isobutoxy group), N-methylol (meth)acrylamide or N-phenyl (meth)acrylamide; glycidyl group-containing monomers such as glycidyl (meth)acrylate or allyl glycidyl ether; silane-containing monomers such as (meth) acryloxypropyl trimethoxysilane or (meth)acryloxypropyl triethoxysilane; and isocyanate group-containing monomers such as (meth)acryloxypropyl isocyanate.

Examples of carbonate polyols include polyols obtained by reacting a carbonate compound and a diol compound.

Examples of carbonate compounds include dimethyl carbonate, diphenyl carbonate and ethylene carbonate. Examples of diol compounds include the same compounds listed as examples of diol compounds that form the aforementioned polyester polyols. In addition, polycarbonate urethane polyols obtained by chain elongation by the aforementioned isocyanate compounds may also be used for the carbonate polyol.

One type of each of the aforementioned polyols may be used alone or two or more types may be used in combination according to the desired functions and performance.

The use of a polyisocyanate compound as a curing agent in these primary agents enables them to be used as a polyurethane-based adhesive. Examples of polyisocyanates used as curing agents are the same as those polyisocyanate compounds listed as examples of chain extenders.

In addition, a carbodiimide compound, oxazoline compound, epoxy compound, phosphorous compound or silane coupling agent and the like may be contained in the first adhesive layer 12 to promote adhesion with the base material layer 11 and the aluminum foil layer 13.

Examples of carbodiimide compounds include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-tolyl-N'-phenylcarbodiimide, N,N'-di-p-nitrophenylcarbodiimlde, N,N'-di-p-aminophenylcarbodiimide, N,N'-di-p-hydroxyphenylcarbodiimide, N,N'-di-cyclohexylcarbodiimide and N,N'-di-p-tolylcarbodiimide.

Examples of oxazoline compounds include monooxazoline compounds such as 2-oxazoline, 2-methyl-2-oxazoline, 2-phenyl-2-oxazoline, 2,5-dimethyl-2-oxazoline or 2,4-diphenyl-2-oxazoline, and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) or 2,2'-(1,4-phenylene)-bis(2-oxazoline).

Examples of epoxy compounds include diglycidyl ethers of aliphatic diols such as 1,6-hexanediol, neopentyl glycol or polyalkylene glycol; polyglycidyl ethers of aliphatic polyols such as sorbitol, sorbitan, polyglycerol, pentaerythritol, diglycerol, glycerol or trimethylolpropane; polyglycidyl ethers of alicyclic diols such as cyclohexane dimethanol; diglycidyl ethers or polyglycidyl ethers of aliphatic and aromatic polyvalent carboxylic acids such as terephthalic acid, isophthalic acid, naphthalene dicarboxylic acid, trimellitic acid, adipic acid or sebacic acid; diglycidyl ethers or polyglycidyl ethers of polyvalent phenols such as resorcinol, bis-(p-hydroxyphenyl)methane, 2,2-bis-(p-hydroxyphenyl) propane, tris-(p-hydroxyphenyl)methane or 1,1,2,2-tetrakis(p-hydroxyphenyl) ethane; N-glycidyl derivatives of amines such as N,N'-diglycidyl aniline, N,N,N-diglycidyl toluidine or N,N,N',N'-tetraglycidyl-bis-(p-amlnophenyl)methane; triglycidyl derivatives of aminophenols; and triglycidyltris(2-hydroxyethyl) isocyanurate, triglycidyl isocyanurate, ortho-cresol epoxies and phenol novolac epoxies.

Examples of phosphorous-based compounds include tris (2,4-di-t-butylphenyl) phosphite, tetrakis(2,4-di-t-butylphenyl)-4,4'-biphenylene phosphonite, bis(2,4-di-t-butylphenyl) pentaerythritol-di-phosphite, bis(2,6-di-t-butyl-4-methylphenyl)pentaerythritol-di-phosphite, 2,2-methylenebis(4,6-di-t-butylphenyl) octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono- and di-nonylphenyl) phosphite, tris(nonylphenyl) phosphite and 4,4'-isopropylidenebis(phenyl-dialkylphosphite).

Examples of silane coupling agents include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane and N-β (aminoethyl)-γ-aminopropyltrimethoxysilane.

In addition, various types of additives and stabilizers in addition to those described above may be blended into the first adhesive layer 12 according to the performance required of the adhesive.

(Aluminum Foil Layer 13)

Ordinary soft aluminum foil can be used for the aluminum foil layer 13, and iron-containing aluminum foil is used preferably from the viewpoints of being able to impart pinhole resistance and extendability during forming.

The iron content of the aluminum foil (100% by weight) is preferably 0.1% by weight to 9.0% by weight and more preferably 0.5% by weight to 2.0% by weight. If the iron content is 0.1% by weight or more, pinhole resistance and extendability improve. If the iron content is 9.0% by weight or less, flexibility improves.

The thickness of the aluminum foil layer 13 is preferably 9 μm to 200 μm and more preferably 15 μm to 100 μm from the viewpoints of barrier properties, pinhole resistance and processability.

Aluminum foil that has been subjected to degreasing treatment is preferably used for the aluminum foil layer 13 from the viewpoint of electrolyte resistance. Degreasing treatment is broadly classified into a wet type and a dry type.

Examples of wet type degreasing treatment include acid degreasing and alkaline degreasing.

Examples of acids used for acid degreasing include inorganic acids such as sulfuric acid, nitric acid, hydrochloric acid or hydrofluoric acid. One type of these acids may be used alone or two or more types may be used in combination. In addition, various types of metal salts serving as supply sources of Fe ions or Ce ions and the like may be incorporated in these organic acids as necessary from the viewpoint of improving etching effects of the aluminum foil.

Examples of bases used for alkaline degreasing include sodium hydroxide used for the purpose of improving etching effects. In addition, other examples include weak bases and those incorporating surfactants.

Wet type degreasing treatment is carried out by immersion or spraying.

An example of dry type degreasing treatment is a method carried out in a step in which aluminum is subjected to annealing treatment. In addition, other examples of this degreasing treatment include flame treatment and corona treatment. Moreover, another example of degreasing treatment consists of oxidatively decomposing and removing contaminants with active oxygen generated by irradiating with ultraviolet light of a specific wavelength.

Degreasing treatment of the aluminum foil layer 13 may be carried out on one side or on both sides thereof.

(Corrosion Prevention Treated Layer 14)

The corrosion prevention treated layer 14 is a layer basically provided for preventing corrosion of the aluminum foil layer 13 by electrolytic solution or hydrofluoric acid. The corrosion prevention treated layer 14 is formed by degreasing treatment, hot water modification treatment, anodic oxidation treatment, chemical conversion treatment or a combination thereof.

Examples of degreasing treatment include acid degreasing and alkaline degreasing. Examples of acid degreasing include methods using an inorganic acid such as sulfuric acid, nitric acid, hydrochloric acid or hydrofluoric acid either alone or as a mixture thereof. In addition, by using an acid degreasing agent obtained by dissolving a fluorine-containing compound such as monosodium ammonium bifluoride with the aforementioned inorganic acids for acid degreasing, in addition to obtaining aluminum degreasing effects, fluorides of aluminum in a passive state can be formed, which is effective from the viewpoint of hydrofluoric acid resistance. Examples of alkaline degreasing include methods using sodium hydroxide and the like.

Examples of hot water modification treatment include boehmite treatment consisting of immersing aluminum foil in boiling water containing triethanolamine.

An example of anodic oxidation treatment is alumite treatment.

Examples of chemical conversion treatment include chromate treatment, zirconium treatment, titanium treatment, vanadium treatment, molybdenum treatment, calcium phosphate treatment, strontium hydroxide treatment, cerium treatment, ruthenium treatment and various types of chemical conversion treatment composed of mixed phases thereof.

When performing this hot water modification treatment, anodic oxidation treatment or chemical conversion treatment, the aforementioned degreasing treatment is preferably performed in advance. In addition, this chemical conversion treatment is not limited to wet treatment, but rather may also be carried out by a coating method in which these treatment agents are mixed with a resin component.

In addition, among the aforementioned treatments, hot water modification treatment and anodic oxidation treatment in particular cause the surface of the aluminum foil to be dissolved by a treatment agent resulting in the formation of an aluminum compound (boehmite or alumite) that has superior corrosion resistance. Consequently, since this results in the formation of a common continuous structure extending from the aluminum foil layer 13 to the corrosion prevented treated layer 14, although such treatment is included in the definition of chemical conversion treatment, it is not included in the definition of chemical conversion treatment to be subsequently described. The corrosion prevention treated layer 14 can also be formed by a simple coating method. An example of such a method consists of using a sol of a rare earth element-based oxide in the manner of cerium oxide having a mean particle diameter of 100 nm or less that has aluminum corrosion preventive effects (inhibitory effects) and is also a preferable material in terms of environmental aspects. The use of this method makes it possible to impart corrosion preventive effects to metal foils such as aluminum foil even when using an ordinary coating method.

Examples of the aforementioned sols of rare earth element-based oxides include sols using various types of solvents such as water or alcohol, hydrocarbon, ketone, ester and ether-based solvents. Aqueous sols are particularly preferable.

A sol in which the surfaces of sol particles of the rare earth element-based oxide are treated by using an inorganic acid such as nitric acid, hydrochloric acid or phosphoric acid or salt thereof, or an organic acid such as acetic acid, malic acid, ascorbic acid or lactic acid, as a dispersion stabilizer is normally used for the aforementioned sol of a rare earth element-based oxide in order to stabilize the dispersion thereof. Among these dispersion stabilizers, phosphoric acid in particular can be expected to (1) stabilize dispersion of the sol, (2) improve adhesion of the aluminum foil layer 13 by utilizing the aluminum chelating ability of phosphoric acid, (3) impart electrolyte resistance by scavenging aluminum ions that have eluted due to the effects of hydrofluoric acid (form a passive state), and (4) improve cohesion of the corrosion prevention treated layer 14 (oxide layer) by facilitating the occurrence of dehydration condensation of phosphoric acid even at low temperatures, in the outer cover material 1.

Examples of the aforementioned phosphoric acid and salts thereof include orthophosphoric acid, pyrophosphoric acid, metaphosphoric acid and alkaline metal or ammonium salts thereof. In particular, condensed phosphoric acids such as trimetaphosphoric acid, tetrametaphosphoric acid or hexametaphosphoric acid as well as alkaline metal salts or ammonium salts thereof are preferable for expressing function in the outer cover material 1. In addition, in consideration of dry film formability (drying capacity, heat capacity) when forming the corrosion prevented treated layer 14 composed of a rare earth oxide by various coating methods using the aforementioned sol of a rare earth oxide, a sodium salt is more preferable from the viewpoint of superior dehydration condensation properties at low temperatures. A water-soluble salt is preferable as a phosphoric acid salt.

The blending ratio of phosphoric acid (or a salt thereof) to cerium oxide is preferably 1 part by weight to 100 parts by weight based on 100 parts by weight of cerium oxide. If the aforementioned blending ratio is equal to or greater than 1 part by weight based on 100 parts by weight of cerium oxide, the cerium oxide sol becomes more stable and the function of the outer cover material 1 is improved. The aforementioned blending ratio is more preferably 5 parts by weight or more based on 100 parts by weight of cerium oxides. In addition, if the aforementioned blending ratio is equal to or less than 100 parts by weight based on 100 parts by weight of cerium oxide, decreases in function of the cerium oxide sol are easily inhibited. The aforementioned blending ratio is more preferably 50 parts by weight or less and even more preferably 20 parts by weight or less based on 100 parts by weight of cerium oxide.

Since the corrosion prevention treated layer 14 formed by the aforementioned rare earth oxide sol consists of an aggregate of inorganic particles, there is the risk of a decrease in the cohesion of the layer per se even after going through a dry curing step. Therefore, the corrosion prevention treated layer 14 in this case is preferably conjugated by an anionic polymer as indicated below in order to supplement cohesion.

An example of the anionic polymer is a polymer having a carboxyl group, specific examples of which include poly (meth)acrylic acid (or a salt thereof) and copolymers obtained by copolymerizing poly(meth)acrylic acid as a main component thereof.

Examples of copolymerizing components of the aforementioned copolymers include alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth) acrylamide, N-alkyl (meth) acrylamide, N,N-dialkyl (meth)acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy (meth)acrylamide, N,N-dialkoxy (meth)acrylamide (of which examples of alkoxy groups include a methoxy group, ethoxy group, butoxy group and isobutoxy group), N-methylol (meth)acrylamide or N-phenyl (meth)acrylamide; hydroxyl group-containing monomers such as 2-hydroxyethyl (meth)acrylate or 2-hydroxypropyl (meth)acrylate; glycidyl group-containing monomers such as glycidyl (meth)acrylate or allylglycidyl ether; silane-containing monomers such as (meth)acryloxypropyl trimethoxysilane or (meth)acryloxypropyl triethoxysilane; and isocyanate group-containing monomers such as (meth)acryloxypropyl isocyanate.

These anionic polymers fulfill the role of improving the stability of the corrosion prevention treated layer 14 (oxide layer) obtained using the rare earth element oxide sol. This is achieved by the effect of protecting a hard, brittle oxide with an acrylic-based resin component as well as the effect of capturing (by functioning as an cation catcher) ionic contaminants (and particularly sodium ions) derived from phosphates contained in the rare earth oxide sol. In other words, if alkaline metal ions such as sodium ions and alkaline earth metal ions in particular are contained in the corrosion prevention treated layer 14 obtained using the rare earth oxide sol, the corrosion prevention treated layer 14 is susceptible to deterioration starting at locations containing those ions. Consequently, the resistance of the corrosion prevention treated layer 14 is improved as a result of the anionic polymer immobilizing sodium ions contained in the rare earth oxide sol.

As a result of combining an anionic polymer and a rare earth element oxide sol, the corrosion prevention treated layer 14 has corrosion prevention performance that is equal to that of the corrosion prevention treated layer 14 formed by carrying out chromate treatment on aluminum foil. The anionic polymer preferably has a structure in which an essentially water-soluble polyanionic polymer is crosslinked. Examples of crosslinking agents used to form this structure include compounds having an isocyanate group, glycidyl group, carboxyl group or oxazoline group.

Examples of compounds having an isocyanate group include diisocyanates such as tolylene diisocyanate, xylylene diisocyanate or hydrogenation products thereof, hexamethylene diisocyanate, 4,4'-diphenylmethane diisocyanate or hydrogenation products thereof, or isophorone diisocyanate; polyisocyanates such as adducts obtained by reacting these isocyanates with a polyvalent alcohol such as trimethylolpropane, biurets obtained by reacting with water, or trimers in the form of isocyanurates; as well as block polyisocyanates obtained by forming blocks of these polyisocyanates with alcohols, lactams or oximes and the like.

Examples of compounds having a glycidyl group include epoxy compounds obtained by allowing epichlorhydrin to act on glycols such as ethylene glycol, diethylene glycol, triethylene glycol, polyethylene glycol, propylene glycol, 1,4-butanediol, 1,6-hexanediol or neopentyl glycol; epoxy compounds obtained by allowing epichlorhydrin to act on polyvalent alcohols such as glycerin, polyglycerin, trimethylolpropane, pentaerythritol or sorbitol; and epoxy compounds obtained by allowing epichlorhydrin to act on dicarboxylic acids such as phthalic acid, terephthalic acid, oxalic acid or adipic acid.

Examples of compounds having a carboxyl group include various types of aliphatic or aromatic dicarboxylic acids. In addition, poly(meth)acrylic acid and alkaline (earth) metal salts of poly(meth)acrylic acid may also be used.

Examples of compounds having an oxazoline group include low molecular weight compounds having two or more oxazoline units, or in the case of using a polymerizable monomer in the manner of isopropenyl oxazoline, copolymers obtained by copolymerizing an acrylic-based monomer such as (meth)acrylic acid, alkyl (meth)acrylic acid ester or hydroxyalkyl (meth)acrylic acid ester.

In addition, a crosslinking point may be siloxane bonded to an anionic polymer by selectively reacting an amine and a functional group in the manner of a silane coupling agent. In this case, examples of compounds that can be used include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane and γ-isocyanatopropyltriethoxysilane. In particular, epoxysilanes, aminosilanes and isocyanate silanes are preferable in consideration of reactivity with the anionic polymer or copolymer thereof.

The ratio of these crosslinking agents to the anionic polymer is preferably 1 part by weight to 50 parts by weight and more preferably 10 parts by weight to 20 parts by weight based on 100 parts by weight of the anionic polymer. If the ratio of the crosslinking agent is equal to or greater than 1 part by weight based on 100 parts by weight of the anionic polymer, a crosslinked structure is formed with sufficient ease. If the ratio of the crosslinking agent is equal to or less than 50 parts by weight based on 100 parts by weight of the anionic polymer, the pot life of a coating liquid improves.

There are no particular limitations on the aforementioned crosslinking agents, and the method used to crosslink the anionic polymer may be a method consisting of the formation of ionic crosslinks using a titanium or zirconium compound.

In order to allow a corrosion prevention treated layer subjected to chemical conversion treatment as exemplified by chromate treatment to form an inclined structure with aluminum foil, the aluminum foil is subjected to treatment using a chemical conversion coating agent that incorporates hydrofluoric acid, hydrochloric acid, nitric acid, sulfuric acid or a salt thereof in particular, followed by forming a chemical conversion treated layer on the aluminum foil by allowing a chromium- or non-chromium-based compound to act thereon. However, since the aforementioned chemical conversion treatment uses an acid for the chemical conversion coating agent, this treatment is accompanied by exacerbation of the working environment and corrosion of coating devices. On the other hand, differing from chemical conversion treatment as exemplified by chromate treatment, the aforementioned coated type of corrosion prevention treated layer 14 is not required to form an inclined structure with the aluminum foil layer 13. Consequently, the properties of the coating agent are not subjected to restrictions such as being acidic, alkaline or neutral, thereby making it possible to realize a favorable working environment. In addition, the coated type of corrosion prevention treated layer 14 is also preferable from the viewpoint that chromate treatment using a chromium compound requires an alternative in terms of environmental health.

In addition, the corrosion prevention treated layer 14 may also employ a multilayer structure by using a cationic polymer as necessary.

Examples of cationic polymers include polyethylene imine, ionic polymer complexes composed of polyethylene imine and a polymer having carboxylic acid, primary amine grafted acrylic resin in which a primary amine is grafted to an acrylic backbone, polyamines or derivatives thereof, and aminophenol.

Cationic polymers are preferably used in combination with a crosslinking agent having a functional group capable of reacting with an amine/imine such as a carboxyl group or glycidyl group. A polymer having a carboxylic acid that forms an ionic polymeric complex with polyethylene imine can also be used for the crosslinking agent used in combination with the cationic polymer, and examples thereof include polycarboxylic acids (salts) such as polyacrylic acid or an ionic salt thereof, copolymers obtained by introducing a co-monomer therein, and polysaccharides having a carboxyl group such as carboxymethyl cellulose or an ionic salt thereof. Examples of polyallylamines include homopolymers and copolymers such as allylamines, allylamine amide hydrochloride, diallylamines or dimethylallylamine. These amines may be in the form of free amines or may be stabilized by acetic acid or hydrochloric acid. In addition, maleic acid or sulfur dioxide and the like may be used as copolymer components. Moreover, types imparted with thermal crosslinkability by partial methoxylation of a primary amine can also be used, and aminophenol can also be used. Allylamines and derivatives thereof are particularly preferable.

In the present invention, cationic polymers are also described as a constituent that composes the corrosion prevented treated layer 14. The reason for this is that, as a result of conducting extensive studies using various compounds in order to impart electrolyte resistance and hydrofluoric acid resistance required by outer cover materials for lithium ion batteries, it was determined that cationic polymers per se are compounds that are capable of imparting electrolyte resistance and hydrofluoric acid resistance. This is presumed to be the result of inhibiting damage to the aluminum foil by capturing fluorine ions with cationic groups (functioning as an anion catcher). For this reason, in the case of using a rare earth oxide sol for the corrosion prevention treated layer 14, a cationic polymer may be used instead of an anionic polymer for the protective layer thereof.

In addition, the corrosion prevention treated layer 14 may also be formed using a coating agent that contains either the aforementioned anionic polymer or cationic polymer.

There are no particular limitations on the combination of the aforementioned components in the coating agent used to form the aforementioned coated type of corrosion prevention treated layer 14, and examples thereof include the combinations of (1) to (7) indicated below:

(1) rare earth oxide sol only;
(2) anionic polymer only;
(3) cationic polymer only;
(4) layered compound consisting of rare earth oxide and anionic polymer;
(5) layered compound consisting of rare earth oxide and cationic polymer;
(6) multilayered laminate obtained by forming a layered compound using a rare earth oxide and anionic polymer followed by further laminating a cationic polymer; and,
(7) multilayered laminated obtained by forming a layered compound using a rare earth oxide and a cationic polymer followed by further laminating an anionic polymer.

In addition, the corrosion prevention treated layer 14 is not limited to the aforementioned layers. For example, the corrosion prevention treated layer 14 may also be formed using a treatment agent incorporating phosphoric acid and a chromium compound in a resin binder (such as aminophenol) in the manner of a known technology in the form of chromate coating. The use of such a treatment agent enables the formation of a layer that is provided with both a corrosion prevention function and adhesion. In addition, compound treatment may also be used that uses the aforementioned cationic polymer or anionic polymer in the aforementioned degreasing treatment, hot water modification treatment, anodic oxidation treatment, chemical conversion treatment or a combination thereof in order to improve adhesion. In addition, a layer consisting of a cationic polymer or anionic polymer may be further laminated on a layer formed by the aforementioned treatment to form a multilayer structure. In addition, a layer can be obtained that is provided with both a corrosion prevention function and adhesion by using a coating agent in which a rare earth oxide sol and polycationic polymer or polyanionic polymer have been preliminarily incorporated into a single liquid, although the stability of the coating liquid must be taken into consideration.

The weight per unit surface area of the corrosion prevention treated layer 14 is preferably 0.005 mg/m$^2$ to 0.200 mg/m$^2$ and more preferably 0.010 mg/m$^2$ to 0.100 mg/m$^2$. If the aforementioned weight per unit surface area is 0.005 mg/m$^2$ or more, a corrosion prevention function is easily imparted to the aluminum foil layer 13. In addition, even if the aforementioned weight per unit surface area exceeds 0.200 mg/m$^2$, there is little change in corrosion prevention function. On the other hand, in the case of using a rare earth oxide sol, heat-curing during drying may become inadequate if the coated film is excessively thick, thereby resulting in the risk of a decrease in cohesion. Furthermore, the thickness of the corrosion prevention treated layer 14 can be converted from the specific gravity thereof.

(Second Adhesive Layer 15)

The second adhesive layer 15 is a layer for adhering the corrosion prevention treated layer 14 and the sealant layer 16. Furthermore, in the case a corrosion prevention treated layer is not formed on the aluminum foil layer on the side of the sealant layer, the aluminum foil layer and the sealant layer are adhered. The second adhesive layer 15 is a layer that contains an adhesive or adhesive resin. In the case of forming the second adhesive layer 15 with an adhesive, the outer cover material 1 can be formed by dry lamination (dry laminated type). In the case the second adhesive layer 15 is formed with an adhesive resin to be subsequently described, the outer cover material 1 can be formed by thermal lamination (thermal laminated type).

The same adhesives used in the first adhesive layer 12 can be used for the adhesive used in the second adhesive layer 15. However, in the case of using an adhesive in the second adhesive layer 15, since the adhesive is affixed to a surface on the side where electrolytic solution is filled, it is necessary to use caution with respect to swelling caused by the electrolytic solution and hydrolysis caused by hydrofluoric acid. Consequently, an adhesive that uses a primary agent having a backbone that is resistant to hydrolysis or an adhesive having improved crosslink density is used preferably.

Examples of methods used to improve crosslink density of an adhesive include methods allowing the obtaining of a dimer fatty acid or ester thereof, hydrogenation product of a dimer fatty acid or ester thereof, reduced glycol of a dimer fatty acid or ester thereof or reduced glycol of a hydrogenation product of a dimer fatty acid or ester thereof, and a polyester polydiol composed of a diol compound. According to these methods, crosslink density is improved by highly bulky hydrophobic units of the dimer fatty acid.

Dimer fatty acids refer to compounds obtained by dimerization of various types of unsaturated fatty acids, an examples of the structure thereof include acyclic types, monocyclic types, polycyclic types and aromatic ring types. There are no particular limitations on the dimer structure of the dimer fatty acid serving as raw material in the polyester polyol used in the second adhesive layer 15. In addition, there are no particular limitations on the type of unsaturated fatty acid used as a starting substance of the dimer fatty acid.

Examples of unsaturated fatty acids include mono-unsaturated fatty acids such as crotonic acid, myristoleic acid, palmitoleic acid, oleic acid, elaidic acid, vaccenic acid, gadoleic acid, eicosenoic acid, erucic acid or nervonic acid; di-unsaturated fatty acids such as linoleic acid, eicosadienoic acid or docosaenoic acid; tri-unsaturated fatty acids such as linolenic acid, pinolenic acid, eleostearic acid, mead acid, dihomo-γ-linolenic acid or eicosatrienoic acid; tetra-unsaturated fatty acids such as stearidonic acid, arachidonic acid, eicosatetraenoic acid or adrenic acid; penta-unsaturated fatty acids such as bosseopentaenoic acid, eicosapentaenoic acid, Osbond acid, clupanodonic acid or tetracosapentenoic acid; and hexa-unsaturated fatty acids such as docosahexaenoic acid or nisinic acid.

There are no particular limitations on the combinations of unsaturated fatty acids subjected to dimerization in the dimer fatty acid, and may be the same unsaturated fatty acids or different unsaturated fatty acids.

Diol compounds listed as examples of diol compounds in the explanation of the polyester polyol of the first adhesive layer 12 can be used for the diol compound.

In addition, in the case of improving crosslink density with the aforementioned dimer fatty acids, a dibasic acid may be introduced that is normally used in the production of polyester polyols. Dibasic acids listed as examples of dibasic acids in the explanation of the polyester polyol of the first adhesive layer 12 can be used for the dibasic acid.

In addition, a polyester urethane polyol, in which hydroxyl groups on both ends of a polyester polyol for which crosslink density has been improved by the aforementioned method have undergone chain elongation by a polyisocyanate compound, is preferable for the adhesive of the second adhesive layer 15. Polyisocyanate compounds listed as examples of polyisocyanate compounds in the explanation of the polyester urethane polyol of the first adhesive layer 12 can be used for the polyisocyanate compound, and one or more types selected from the group consisting of crude tolylene diisocyanate, crude diphenylmethane diisocyanate and polymeric diphenylmethane diisocyanate are preferable.

Although polyisocyanate compounds listed as examples of polyisocyanate compounds in the explanation of the first adhesive layer 12 can be used as curing agents in the adhesive that forms the second adhesive layer 15, in the case of improving electrolyte resistance in particular (and especially solubility and swelling with respect to electrolytic solution), one or more types of polyisocyanates selected from the group consisting of crude tolylene diisocyanate, crude diphenylmethane diisocyanate and polymeric diphenylmethane diisocyanate, or an adduct of these polyisocyanates, are preferable. As a result, in addition to improving crosslink density and reducing solubility and swelling with respect to electrolytic solution, the second adhesive layer 15 improves adhesion by improving urethane group concentration.

The ratio of curing agent in the adhesive that forms the second adhesive layer 15 is preferably 1 part by weight to 100 parts by weight and more preferably 5 parts by weight to 50 parts by weight based on 100 parts by weight of the primary agent. If the aforementioned ratio of curing agent is equal to or greater than the lower limit of the aforementioned ranges, adhesion and electrolyte resistance improve. If the aforementioned ratio of curing agent is equal to or less than the upper limit of the aforementioned ranges or if the ratio is 100 parts by weight or less, the detrimental effects of isocyanate groups of unreacted curing agent on coated film properties and the like of the second adhesive layer 15 are easily inhibited.

In addition, in the case of forming the second adhesive layer 15 with an adhesive, a carbodiimide compound, oxazoline compound, epoxy compound, phosphorous compound or silane coupling agent and the like may be incorporated to promote adhesion in the same manner as the first adhesive layer 12.

The adhesive used in the second adhesive layer 15 is not limited to the aforementioned composition, that which is resistant to electrolytic solution and hydrofluoric acid is used, and adhesives using as a base thereof a polyolefin polyol or acrylic polyol can also be applied.

In addition, in the case of forming the second adhesive layer 15 with an adhesive resin, examples of the adhesive resin include modified polyolefins obtained by graft modification of an unsaturated carboxylic acid or unsaturated carboxylic acid derivative derived from an acid anhydride thereof or ester thereof in the form of a polyolefin resin in the presence of an organic peroxide.

Examples of polyolefin resins include low density polyethylene, medium density polyethylene, high density polyethylene, ethylene-α-olefin copolymers, homo-, block- or random polypropylenes, and propylene-α-olefin copolymers.

Examples of compounds used during graft modification of polyolefin resin include unsaturated carboxylic acids, acid anhydrides thereof and esters thereof (to be collectively referred to as "unsaturated carboxylic acids and the like"). Specific examples include unsaturated carboxylic acids such as acrylic acid, methacrylic acid, maleic acid, fumaric acid, itaconic acid, citraconic acid, tetrahydrophthalic acid or bicyclo[2.2.1]hept-2-ene-5,6-dicarboxylic acid; unsaturated carboxylic acid anhydrides such as maleic anhydride, itaconic anhydride, citraconic anhydride, tetrahydrophthalic anhydride or bicyclo[2.2.1]hept-2-ene-5,6-dicarboxylic acid anhydride; and, esters of unsaturated carboxylic acids such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate or dimethyl bicyclo[2.2.1]hept-2-ene-5,6-dicarboxlyate.

The aforementioned modified polyolefin resin can be produced by reacting 0.2 parts by weight to 100 parts by weight of an unsaturated carboxylic acid and the like with 100 parts by weight of polyolefin resin serving as the base while heating in the presence of a radical initiator.

The reaction temperature of the modification reaction is preferably 50° C. to 250° C. and more preferably 60° C. to 200° C.

Although varying according to the production method, in the case of a molten graft reaction using a twin screw extruder, the residence time in the extruder is preferably 2 minutes to 30 minutes and more preferably 5 minutes to 10 minutes.

In addition, the modification reaction can be carried out under conditions of either normal pressure or under pressurization.

Examples of the radical initiator used in the aforementioned modification reaction include organic peroxides. Examples of these organic peroxides include alkyl peroxides, aryl peroxides, acyl peroxides, ketone peroxides, peroxyketals, peroxycarbonates, peroxyesters and hydroperoxides.

These organic peroxides can be suitably selected corresponding to the reaction temperature and reaction time. For example, in the case of a molten graft reaction using a twin-screw extruder, an alkyl peroxide, peroxyketal or peroxyester is preferable, and di-t-butyl peroxide, 2,5-dimethyl-2,5-di-t-butylperoxide-3-benzene or dicumyl peroxide is more preferable.

A typical example of a modified polyolefin resin obtained by graft modification in the manner described above is a polyolefin resin that has been modified by maleic anhydride, and examples thereof include Admer manufactured by Mitsui Chemicals Inc., Modic manufactured by Mitsubishi Chemical Corp., and Adtex manufactured by Nippon Polyethylene Corp. These modified polyolefin resins impart adhesion by utilizing the reactivity between a grafted unsaturated carboxylic acid or unsaturated carboxylic acid derivative derived from an acid anhydride thereof or ester thereof, and various types of metals or polymers containing various types of functional groups. In addition, differing from adhesion generated by this type of reaction, residual stress generated when laminating the aforementioned modified polyolefin resin can be released and improvement of viscoelastic adhesion can be imparted by incorporating various types of thermoplastic elastomers.

Preferable examples of the aforementioned thermoplastic elastomers include Tafiner manufactured by Mitsui Chemicals Inc., Catalloy manufactured by Montell Co., Notio manufactured by Mitsui Chemicals Inc. as well as Tafthren manufactured by Sumitomo Chemical Co., Ltd., styrene-based elastomers, and particularly hydrogenated styrene-based elastomers (such as Tuftec manufactured by Asahi Kasei Chemicals Corp., Septon/Hybrar manufactured by Kuraray Co., Ltd., Dynalon manufactured by JSR Corp., Espolex manufactured by Sumitomo Chemical Co., Ltd., and Kraton G manufactured by Kraton Polymers llc.).

In addition, in the case of forming the second adhesive layer 15 with an adhesive resin, various types of additives may also be incorporated, such as a flame retardant, slipping agent, anti-blocking agent, antioxidant, photostabilizer or pressure-sensitive adhesion promoter.

(Sealant Layer 16)

The sealant layer 16 is a layer affixed to the aluminum foil layer 14 on which the corrosion prevention treated layer 14 is formed with the second adhesion layer 15 interposed there between, and imparts sealing properties in the outer cover material 1 by heat sealing.

Examples of components that compose the sealant layer 16 include polyolefin resins such as low density polyethylene, medium density polyethylene, high density polyethylene, ethylene-α-olefin copolymers, homo-, block- or random polypropylenes or propylene-α-olefin copolymers, ethylene-vinyl acetate copolymers, ethylene-(meth)acrylic acid copolymers and esterification products or ionic crosslinking products thereof.

The sealant layer 16 may be in the form of a single layer composed of one type of the aforementioned components or a blended material composed of two or more types, or may be in the form of a multilayer structure in accordance with other performance requirements of the sealant. Examples of the sealant layer 16 having a multilayer structure include sealant layers interposed with a resin having gas impermeability, such as a partially saponified or completely saponified ethylene-vinyl acetate copolymer or partially saponified or completely saponified polyvinyl acetate copolymer.

(Production Method)

The following provides an explanation of a production method of the outer cover material 1. However, the production method of the outer cover material 1 is not limited to the method indicated below.

The production method of the outer cover material 1 has the three steps (I) to (III) indicated below:

(I) a step for forming the corrosion prevention treated layer 14 on the aluminum foil layer 13;

(II) a step for laminating the base material 11 through the first adhesive layer 12 onto the aluminum foil layer 13 on the opposite side from the side on which the corrosion prevention treated layer 14 has been formed; and, (III) a step for laminating the sealant layer 16 through the second adhesive layer 15 on the aluminum foil layer 13 on the side of the corrosion prevention treated layer 14.

Step (I):

The corrosion prevention treated layer 14 is formed on one side of the aluminum foil layer 13 by carrying out degreasing treatment, hot water modification treatment, anodic oxidation treatment, chemical conversion treatment or by applying a coating agent having corrosion prevention performance.

Examples of methods used to carry out degreasing treatment include annealing, spraying and immersion.

An example of a method used to carry out hot water modification treatment of anodic oxidation treatment is immersion.

The method used to carry out chemical conversion treatment can be selected from among immersion, spraying and coating corresponding to the type of chemical conversion treatment.

Various types of methods such as gravure coating, reverse coating, roll coating or bar coating can be employed as the method for coating the coating agent having corrosion prevention performance.

The amount of coating agent applied is preferably within a range that satisfies the aforementioned weight per unit surface area of the corrosion prevention treated layer 14. In addition, in the case of requiring dry curing, drying curing can be carried out within a range of 60° C. to 300° C. for the substrate temperature corresponding to the drying conditions used when drying the corrosion prevention treated layer 14.

Step (II):

The base material layer 11 is laminated by a method such as dry lamination, non-solvent lamination or wet lamination using an adhesive that forms the first adhesive layer 12 on the side of the aluminum foil layer 13 on the opposite side from the side on which the corrosion prevention treated layer 14 has been formed. The dried coated amount of the adhesive is preferably 1 g/m$^2$ to 10 g/m$^2$ and more preferably 3 g/m$^2$ to 7 g/m$^2$.

In step (II), aging treatment may also be carried out within a range of room temperature to 100° C. in order to promote adhesion.

Step (III):

In the case of forming the second adhesive layer with an adhesive, the sealant layer is laminated by a method such as dry lamination, non-solvent lamination or wet lamination onto the side having the corrosion prevention treated layer 14 of a laminate obtained by laminating the base material layer 11, the first adhesive layer 12, the aluminum foil layer 13 and the corrosion prevention treated layer 14 in that order. The dried coated amount of the adhesive is preferably 1 g/m$^2$ to 10 g/m$^2$ and more preferably 3 g/m$^2$ to 7 g/m$^2$. Aging treatment may also be carried out in this case as well within a range of room temperature to 100° C. in order to promote adhesion in the same manner as step (II).

In addition, in the case of forming the second adhesive layer with an adhesive resin, the sealant layer 16 is laminated through the adhesive resin on the side having the corrosion prevention treated layer 14 of the aforementioned laminate by sandwich lamination using an extrusion laminator. In this case, heat treatment is preferably carried out on a laminate composed of the base material layer 11, the first adhesive layer 12, the aluminum foil layer 13, the corrosion prevention treated layer 14, the second adhesive layer 15 and the sealant layer 16. As a result of this heat treatment, adhesion is improved between the aluminum foil layer 13, the corrosion prevention treated layer 14, the second adhesive layer 15 and the sealant layer 16, thereby improving electrolyte resistance and hydrofluoric acid resistance.

From the viewpoint of productivity and handling ease, the method used to carry out heat treatment preferably consists of passing through a drying oven or baking oven set to a high temperature (such as 100° C. or higher), thermal lamination (thermocompression bonding), or containing in a Yankee dryer (heat dryer).

The heat treatment temperature is preferably set so that the maximum attainable temperature of the aforementioned laminate is within the range of room temperature to a temperature 20° C. higher than the melting point of the sealant layer 16, or preferably set so that the maximum attainable temperature of the aforementioned laminate is within the range of the melting point of the adhesive resin to the melting point of the sealant layer 16.

Treatment time varies according to heat treatment temperature, and a longer treatment time is preferable in the case of a low heat treatment temperature, while a shorter treatment time is preferable in the case of a high heat treatment temperature.

The outer cover material 1 is obtained according to the steps (I) to (III) explained above.

Furthermore, the production method of the outer cover material 1 is not limited to a method consisting of sequentially carrying out the aforementioned steps (I) to (III). For example, step (I) may be carried out after carrying out step (II). In addition, the corrosion prevention treated layer may be provided on both sides of the aluminum foil layer. In addition, step (II) may be carried out after carrying out step (III).

The outer cover material of the present invention as explained above has sufficient electrolyte resistance and superior deep-drawing formability even without undergoing chromate treatment.

Strength properties of an outermost layer in the form of the base material layer have a considerable effect on deep-drawing formability of the outer cover material. Although deep-drawing formability can be improved by using a drawn film having little directivity of mechanical properties for the base material layer 11 as in the aforementioned outer cover material 1, the method used to produce the drawn film is limited to inflation molding. In contrast, superior deep-drawing formability is obtained even if uniformity of mechanical properties of the film base material (A) is low by using for the base material layer the film base material (A) in which the difference ($\alpha 2-\alpha 1$) between elasticity to the yield point ($\alpha 1$) and elasticity to the rupture point ($\alpha 2$) as measured according to JIS-K7127 is 100% or more in at least one of the MD direction and TD direction. Consequently, the outer cover material of the present invention is easily produced since the film base material (A) can also be produced by casting without being limited to inflation molding.

In addition, since it is also not necessary to especially increase the heat shrinkage factor of the outer cover material of the present invention, the occurrence of curling and the like when heat is applied in the baking step and the like during battery production can also be inhibited.

Furthermore, the outer cover material of the present invention is not limited to the previously described outer cover material 1. For example, the corrosion prevention treated layer may at least be provided on the aluminum foil layer on the side of the sealant layer, or may be provided on both sides of the aluminum foil layer.

The following provides a detailed explanation of an embodiment 2 of the present invention, which is an example of an embodiment of the lithium ion battery outer cover material of the present invention. Furthermore, those matters for which a detailed explanation is not provided are the same as those of the previously described embodiment 1.

As shown in FIG. 1, the outer cover material 1 of the present embodiment is a laminate obtained by sequentially laminating on one side of the base material layer 11 the first adhesive layer 12, the aluminum foil layer 13 provided with the corrosion prevention treated layer 14 on the opposite side from the base material layer 11, the second adhesive layer 15, and the sealant layer 16.

(Base Material Layer 11)

The base material layer 11 is a layer having the film base material (A) as indicated below.

Film base material (A): drawn polyamide film base material in which elasticity to the rupture point x (units: %) and tensile stress at the rupture point y (units: MPa) as measured according to JIS-K7127 satisfy the relationships represented by the following formulas (1) and (2).

$$y \geq -2x+460 \quad (1)$$

$$y \geq 200 \quad (2)$$

As a result of the film base material (A) satisfying the aforementioned formulas (1) and (2), even in the case of a film base material having a low elasticity to the rupture point x, superior deep-drawing formability is obtained since the tensile stress at the rupture point y compensates for that elastic property. In addition, since the film base material (A) satisfies the aforementioned formulas (1) and (2), even in the case of a film base material having a small tensile stress at the rupture point y (but at least 200 MPa or more), superior deep-drawing formability is obtained since elasticity to the rupture point x compensates for that strength property.

Tensile stress at the rupture point y is 200 MPa or more as indicated in the aforementioned formula (2).

If the tensile stress at the rupture point y is 200 MPa or more, since the film base material (A) is able to adequately withstand stress applied during deep drawing, the occurrence of cracks and other forming defects can be inhibited. Tensile stress at the rupture point y is preferably 250 MPa or more and more preferably 300 MPa or more.

Although varying according to tensile stress at the rupture point y, elasticity to the rupture point x is preferably 80% or more and more preferably 100% or more. If elasticity to the rupture point x is equal to or greater than the lower limit of the aforementioned range, formability improves.

The film base material (A) is a drawn polyamide film base material. In other words, it is a film base material obtained by drawing a base material formed from a polyamide resin.

The polyamide resin is a thermoplastic polymer compound having an amide bond (—CONH—) in a molecule thereof. There are no particular limitations on the polyamide resin, and it is preferably a polyamide resin having oriented crystallization.

Specific examples of polyamide resins include poly-$\epsilon$-capramide (Nylon 6), polyhexamethylene adipamide (Nylon 66), polyhexamethylene sebacamide (Nylon 610), polyaminoundecamide (Nylon 11), polylaurylamide (Nylon 12), polymetaxylene diadipamide (MXD6) and copolymers thereof. Nylon 6 and Nylon 66 are used particularly preferably for the polyamide resin.

The polyamide resin may consist of one type or two or more types.

In addition, various types of rubber components or solubilizing agents and the like may be incorporated in the film base material (A) as necessary in order to improve strength properties. In addition, various types of additives such as a lubricant, antistatic agent, anti-blocking agent or inorganic fine particles may be added to the film base material (A) as necessary within a range that does not have a detrimental effect on performance of the film base material (A).

The film base material (A) is produced, for example, by the method indicated below.

A polyamide resin is formed into a film by extruding and melting with an extruder equipped with a T die, and an undrawn film base material is obtained by rapid-cooling deposition of the molten resin formed into a film on a rotating cooling drum by a known casting method such as air knife casting or electrostatic casting. Next, the undrawn film base material is preheated by a roller-type vertical drawing machine composed of a group of heating rollers having different peripheral velocities, and the undrawn film base material is drawn vertically between drawing rollers heated to a temperature equal to or higher than the glass transition temperature of the undrawn film base material and cold rollers for cooling the film. Moreover, the vertically drawn film base material is then led to a tender, and after preheating to 50° C. to 70° C., is drawn horizontally at 60° C. to 110° C. to obtain the film base material (A).

In addition, the ratio of the vertical draw ratio and horizontal draw ratio may be adjusted, and heat treatment and relaxation treatment may be further carried out at 210° C. to 220° C. in the tender as necessary.

The method used to produce the aforementioned undrawn film base material is not limited to the aforementioned casting method, but rather may also be produced by, for example, inflation molding the facilitates the obtaining of a film base material having little directivity of mechanical properties.

In addition, drawing may be uniaxial drawing or biaxial drawing. Biaxial drawing is not only limited to sequential biaxial drawing as described above, but may also be simultaneous biaxial drawing.

The thickness of the film base material (A) is preferably 6 μm or more and more preferably 10 μm or more from the viewpoints of improving pinhole resistance and insulating properties. In addition, the thickness of the film base material (A) is preferably 50 μm or less and more preferably 25 μm or less from the viewpoint of improving deep-drawing formability.

The outer cover material of the present invention as explained above has adequate electrolyte resistance and superior deep-drawing formability even without undergoing chromate treatment.

Strength properties of the outermost layer in the form of base material layer have a considerable effect on deep-drawing formability of the outer cover material. Although deep-drawing formability can be improved by using a drawn film having little directivity of mechanical properties for the base material layer 11 as in the outer cover material of (i) above, the method used to produce the drawn film is limited to impression molding. In contrast, the outer cover material of the present invention allows the obtaining of superior deep-drawing formability even if uniformity of mechanical properties of the film base material (A) is low by using for the base material layer the drawn polyamide film base material (film base material (A)) in which the aforementioned elasticity to the rupture point x and tensile stress at the rupture point y as measured according to JIS-K7127 satisfy the aforementioned formulas (1) and (2). Consequently, since the film base material (A) can also be produced by casting without being limited to inflation molding, the outer cover material of the present invention has superior productivity.

In addition, since it is also not necessary to especially increase the heat shrinkage factor of the outer cover material of the present invention, the occurrence of curling and the like when heat is applied in the baking step and the like during battery production can also be inhibited.

The following provides a detailed explanation of an embodiment 3 of the present invention, which is an example of an embodiment of the lithium ion battery outer cover material of the present invention.

A lithium ion battery outer cover material 10 of the present embodiment (to also be referred to as "outer cover material 10") is obtained by sequentially laminating on one side of a base material (SB) 11 to be subsequently described a first adhesive layer (AD-1) 12, an aluminum foil layer (AL) 13, a corrosion prevention treated layer (CL) 14, a second adhesive layer (AD-2) 15 and a sealant layer (SL) 16 to be subsequently described. The innermost layer of the outer cover material 10 is the sealant layer (SL) 16.

<Base Material Layer (SB)>

The base material layer (SB) 11 fulfills the role of imparting heat resistance in the sealing step during production of a lithium battery and inhibiting the formation of pinholes that can occur during processing and distribution. The base material layer (SB) 11 has a drawn polyamide film in which the ratio $\gamma d/\gamma$ of a dispersive component of surface free energy $\gamma d$ to surface free energy $\gamma$ is 80% or less (to be referred to as "drawn Ny film A"). Superior moldability is obtained as a result of the base material layer (SB) 11 having this drawn Ny film A.

The surface free energy $\gamma$ and dispersive component of surface free energy $\gamma d$ of the drawn Ny film A are calculated from the following equations (1) and (2) using three types of liquids consisting of water, methylene iodide and α-bromonaphthalene, for which surface free energy and each component thereof (dispersion force, polar force and hydrogen bonding strength) are known, measuring contact angle at the film surface under conditions of 20° C. and 50% RH, and introducing according to the extended Fowke's equation and Young's equation.

$$(\gamma d \cdot \gamma_s d)^{1/2}+(\gamma p \cdot \gamma_s p)^{1/2}+(\gamma h \cdot \gamma_s h)^{1/2}=\gamma_s(1+\cos\theta)/2 \quad (1)$$

$$\gamma=\gamma d+\gamma p+\gamma h \quad (2)$$

In the aforementioned equations, $\gamma_s$, $\gamma_s d$, $\gamma_s p$ and $\gamma_s h$ (units: mN/m) represent surface free energy of the measured liquids along with each of the components of dispersion force, polar force and hydrogen bonding strength thereof. $\gamma$, $\gamma d$, $\gamma p$ and $\gamma h$ (units: mN/m) represent surface free energy on the measured surface of the film along with each of the components of dispersion force, polar force and hydrogen bonding strength thereof. In addition, $\theta$ represents the contact angle of a measured liquid on the measured surface. The contact angle $\theta$ is measured at five locations on the same measured surface followed by determination of the average value thereof.

The reason why superior moldability is obtained as a result of the aforementioned ratio $\gamma d/\gamma$ being made to be 80% or less is not necessarily clear. Although the strength properties of a drawn film base material vary considerably according to drawing conditions (such as draw ratio, drawing temperature and heat setting conditions), changes in molecular orientation and degree of crystallization of the polymer molecular chain attributable to drawing conditions are presumed to have an effect on the aforementioned ratio $\gamma d/\gamma$, and some form of correlation is presumed to exist between strength properties of a drawn film and the ratio $\gamma d/\gamma$.

The dispersive component of surface free energy $\gamma d$ of the drawn Ny film A is preferably 40 mN/m or less from the viewpoint of moldability.

In addition, the contact angle when α-bromonaphthalene is dropped onto the surface of the drawn Ny film A is preferably 20° or more from the viewpoint of moldability.

The drawn Ny film A may be a uniaxially drawn polyamide film or biaxially drawn polyamide film. A biaxially drawn polyamide film is particularly preferable from the viewpoint of moldability.

There are no particular limitations on the polyamide resin that forms the drawn Ny film A, an example thereof is a thermoplastic polymer compound having an amide bond (—CONH—) in a molecule thereof. A polyamide resin having oriented crystallization is particularly preferable. Specific examples of polyamide resins include poly-ε-capramide (Nylon 6), polyhexamethylene adipamide (Nylon 66), polyhexamethylene sebacamide (Nylon 610), polyaminoundecamide (Nylon 11), polylaurylamide (Nylon 12), polymetaxylene diadipamide (MXD6) and copolymers thereof. Nylon 6 and Nylon 66 are used particularly preferably from the viewpoint of moldability.

Various types of rubber components or solubilizing agents and the like may be incorporated in the drawn Ny film A as necessary for the purpose of improving strength properties. In addition, various types of additives such as a lubricant, antistatic agent, anti-blocking agent or inorganic fine particles may be added within a range that does not have a detrimental effect on film performance.

The base material layer (SB) 11 may be a layer composed of the drawn Ny film A alone, or may be a layer composed of a laminated film the drawn Ny film A and other film. Films composed of a resin having insulating properties are preferable for the other film, and examples thereof include a drawn or undrawn polyester film, polypropylene film and polyamide film other than the drawn Ny film A. A drawn polyester film is preferable from the viewpoint of improving moldability, heat resistance, pinhole resistance and insulating properties.

In the case the other film is a drawn film, the other film may be a uniaxially drawn film or a biaxially drawn film.

The thickness of the base material layer (SB) 11 is preferably 6 μm to 40 μm and more preferably 10 μm to 25 μm.

In the case the base material layer (SB) 11 is a laminated film consisting of the drawn Ny film A and another film, the thickness of the drawn Ny film A is preferably 6 μm or more from the viewpoint of moldability. In addition, the thickness of the drawn Ny film A in this case is also preferably 40 μm or less from the viewpoint of moldability.

<First Adhesive Layer (AD-1)>

The first adhesive layer (AD-1) 12 is a layer for adhering the base material layer (SB) 11 and the aluminum foil layer (AL) 13. An example of an adhesive that forms the first adhesive layer (AD-1) 12 is as polyurethane resin in which an isocyanate compound having two or more functional groups is allowed to act on a primary agent such as a polyester polyol, polyether polyol, acrylic polyol or carbonate polyol.

A polyester polyol is obtained by reacting one or more types of dibasic acids with one or more types of diols.

Examples of dibasic acids include aliphatic dibasic acids such as succinic acid, glutaric acid, adipic acid, pimelic acid, suberic acid, azelaic acid, sebacic acid or brazilic acid, and aromatic dibasic acids such as isophthalic acid, terephthalic acid or naphthalene dicarboxylic acid.

Examples of diols include aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol, and aromatic diols such as xylylene glycol.

In addition, polyester urethane polyols, in which hydroxyl groups on both ends of the aforementioned polyester polyol have undergone chain elongation by reacting one or more types of isocyanate compounds having two or more functional groups, may be used.

Examples of the aforementioned isocyanate compounds having two or more functional groups include 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidene dicyclohexyl-4,4'-diisocyanate. In addition, polyester urethane polyols may also be used that have undergone chain elongation by using an adduct, biuret or isocyanurate of these isocyanate compounds.

Examples of polyether polyols include polyether urethane polyols that have undergone chain elongation as a result of allowing the aforementioned isocyanate compounds to act thereon, such as polyethylene glycol or polypropylene glycol.

Examples of acrylic polyols include copolymers having poly(meth)acrylic acid for the main component thereof. Examples of components that copolymerize with (meth) acrylic acid include hydroxyl group-containing monomers such as 2-hydroxyethyl (meth)acrylate or 2-hydroxypropyl (meth)acrylate; alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth) acrylamide, N-alkyl (meth)acrylamide, N,N-dialkyl (meth) acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy (meth)acrylamide, N,N-dialkoxy (meth)acrylamide (of which examples of alkoxy groups include a methoxy group, ethoxy group, butoxy group and isobutoxy group), N-methylol (meth)acrylamide or N-phenyl (meth)acrylamide; glycidyl group-containing monomers such as glycidyl (meth)acrylate or allyl glycidyl ether; silane-containing monomers such as (meth) acryloxypropyl trimethoxysilane or (meth)acryloxypropyl triethoxysilane; and isocyanate group-containing monomers such as (meth)acryloxypropyl isocyanate.

Carbonate polyols are obtained by reacting a carbonate compound with a diol. Examples of carbonate compounds include dimethyl carbonate, diphenyl carbonate and ethylene carbonate. Examples of diols include the same diols listed as examples of diols for the aforementioned polyester polyols.

In addition, polycarbonate urethane polyols obtained by chain elongation of carbonate polyols obtained from the aforementioned carbonate compounds and diols by the aforementioned isocyanate compounds may also be used.

One type of each of these polyols may be used alone or two or more types may be used in combination according to the desired functions and performance.

Examples of curing agents allowed to act on the aforementioned primary agent include isocyanate compounds listed as examples of the aforementioned chain extenders.

A carbodiimide compound, oxazoline compound, epoxy compound, phosphorous compound or silane coupling agent and the like may be incorporated in the first adhesive layer (AD-1) 12 to promote adhesion.

Examples of carbodiimide compounds include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide and N,N'-di-p-tolylcarbodiimide.

Examples of oxazoline compounds include monooxazoline compounds such as 2-oxazoline, 2-methyl-2-oxazoline, 2-phenyl-2-oxazoline, 2,5-dimethyl-2-oxazoline or 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) or 2,2'-(1,4-phenylene)-bis(2-oxazoline).

Examples of epoxy compounds include diglycidyl ethers of aliphatic diols such as 1,6-hexanediol, neopentyl glycol or polyalkylene glycol; polyglycidyl ethers of aliphatic polyols such as sorbitol, sorbitan, polyglycerol, pentaerythritol, diglycerol, glycerol or trimethylolpropane; polyglycidyl ethers of alicyclic diols such as cyclohexane dimethanol; diglycidyl ethers or polyglycidyl ethers of aliphatic and aromatic polyvalent carboxylic acids such as terephthalic acid, isophthalic acid, naphthalene dicarboxylic acid, trimellitic acid, adipic acid or sebacic acid; diglycidyl ethers or polyglycidyl ethers of polyvalent phenols such as resorcinol, bis-(p-hydroxyphenyl)methane, 2,2-bis-(p-hydroxyphenyl) propane, tris-(p-hydroxyphenyl)methane or 1,1,2,2-tetrakis(p-hydroxyphenyl)ethane; N-glycidyl derivatives of amines such as N,N'-diglycidyl aniline, N,N,N-diglycidyl toluidine or N,N,N',N'-tetraglycidyl-bis-(p-aminophenyl)methane; triglycidyl derivatives of aminophenols; and triglycidyltris(2-hydroxyethyl) isocyanurate, triglycidyl isocyanurate, ortho-cresol epoxies and phenol novolac epoxies.

Examples of phosphorous-based compounds include tris (2,4-di-t-butylphenyl) phosphite, tetrakis(2,4-di-t-butylphenyl)-4,4'-biphenylene phosphonite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono- and di-nonylphenyl) phosphite, tris(nonylphenyl) phosphite and 4,4'-isopropylidenebis(phenyl-dialkylphosphite).

Examples of silane coupling agents include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane and N-β(aminoethyl)-γ-aminopropyltrimethoxysilane.

In addition, various types of other additives and stabilizers may be incorporated according to the performance required of the adhesive.

<Aluminum Foil Layer (AL)>

Ordinary soft aluminum foil can be used for the aluminum foil layer (AL) 13, and iron-containing aluminum foil is used preferably from the viewpoints of being able to impart pinhole resistance and extendability during forming.

The iron content of the aluminum foil (100% by weight) is preferably 0.1% by weight to 9.0% by weight and more preferably 0.5% by weight to 2.0% by weight. If the iron content is 0.1% by weight or more, pinhole resistance and extendability improve. If the iron content is 9.0% by weight or less, flexibility improves.

The thickness of the aluminum foil layer (AL) 13 is preferably 9 μm to 200 μm and more preferably 15 μm to 100 μm from the viewpoints of barrier properties, pinhole resistance and processability.

Aluminum foil that has been subjected to degreasing treatment is preferably used for the aluminum foil layer (AL) 13 from the viewpoint of electrolyte resistance. Degreasing treatment is broadly classified into a wet type and a dry type.

Examples of wet type degreasing treatment include acid degreasing and alkaline degreasing.

Examples of acids used for acid degreasing include inorganic acids such as sulfuric acid, nitric acid, hydrochloric acid or hydrofluoric acid. One type of these acids may be used alone or two or more types may be used in combination. In addition, various types of metal salts serving as supply sources of Fe ions or Ce ions and the like may be incorporated in these organic acids as necessary from the viewpoint of improving etching effects of the aluminum foil.

Examples of bases used for alkaline degreasing include sodium hydroxide used for the purpose of improving etching effects. In addition, other examples include weak bases and those incorporating surfactants.

Wet type degreasing treatment is carried out by immersion or spraying.

An example of dry type degreasing treatment is a method carried out in a step in which aluminum is subjected to annealing treatment. In addition, other examples of this degreasing treatment include flame treatment and corona treatment. Moreover, another example of degreasing treatment consists of oxidatively decomposing and removing contaminants with active oxygen generated by irradiating with ultraviolet light of a specific wavelength.

Degreasing treatment of the aluminum foil layer (AL) 13 may be carried out on one side or on both sides thereof.

<Corrosion Prevention Treated Layer>

The corrosion prevention treated layer (CL) 14 is a layer provided for preventing corrosion of the aluminum foil layer (AL) 13 by electrolytic solution or hydrofluoric acid. The corrosion prevention treated layer (CL) 14 is formed by degreasing treatment, hot water modification treatment, anodic oxidation treatment, chemical conversion treatment or a combination thereof.

Examples of degreasing treatment include acid degreasing and alkaline degreasing. Examples of acid degreasing include methods using an inorganic acid such as the aforementioned sulfuric acid, nitric acid, hydrochloric acid or hydrofluoric acid either alone or as a mixture thereof. In addition, an acid degreasing agent obtained by dissolving a fluorine-containing compound such as monosodium ammonium bifluoride with the aforementioned inorganic acids may be used for acid degreasing. As a result, in addition to obtaining aluminum degreasing effects, fluorides of aluminum in a passive state are formed and hydrofluoric acid resistance is further improved. Examples of alkaline degreasing include methods using sodium hydroxide and the like.

Examples of hot water modification treatment include boehmite treatment consisting of immersing aluminum foil in boiling water containing triethanolamine.

An example of anodic oxidation treatment is alumite treatment.

Examples of chemical conversion treatment include chromate treatment, zirconium treatment, titanium treatment, vanadium treatment, molybdenum treatment, calcium phosphate treatment, strontium hydroxide treatment, cerium treatment, ruthenium treatment and various types of chemical conversion treatment composed of mixed phases thereof.

When performing this hot water modification treatment, anodic oxidation treatment or chemical conversion treatment, the aforementioned degreasing treatment is preferably performed in advance.

In addition, among the aforementioned treatments, hot water modification treatment and anodic oxidation treatment in particular cause the surface of the aluminum foil to be dissolved by a treatment agent resulting in the formation of an aluminum compound (boehmite or alumite) that has superior corrosion resistance. Consequently, since this results in the formation of a common continuous structure extending from the aluminum foil layer (AL) 13 to the corrosion prevented treated layer (CL) 14, although such treatment is included in the definition of chemical conversion treatment, it is not included in the definition of chemical conversion treatment to be subsequently described. The corrosion prevention treated layer (CL) 14 can also be formed by a simple coating method. An example of such a method consists of using a sol of a rare earth element-based oxide in the manner of cerium oxide having a mean particle diameter of 100 nm or less that has aluminum corrosion preventive effects (inhibitory effects) and is also a preferable material in terms of environmental aspects. The use of this method makes it possible to impart corrosion preventive effects to metal foils such as aluminum foil even when using an ordinary coating method.

Examples of the aforementioned sols of rare earth element-based oxides include sols using various types of solvents such as aqueous, alcohol, hydrocarbon, ketone, ester and ether-based solvents. Aqueous sols are particularly preferable.

An inorganic acid such as nitric acid, hydrochloric acid or phosphoric acid or a salt thereof, or an organic acid such as acetic acid, malic acid, ascorbic acid or lactic acid, is normally used as a dispersion stabilizer in the aforementioned sol of a rare earth element-based oxide in order to stabilize the dispersion thereof. Among these dispersion stabilizers, phosphoric acid in particular is expected to (1) stabilize dispersion of the sol, (2) improve adhesion of the aluminum foil layer 13 by utilizing the aluminum chelating ability of phosphoric acid, (3) impart electrolyte resistance by scavenging (forming a passive state) aluminum ions that have eluted due to the effects of hydrofluoric acid, and (4) improve cohesion of the corrosion prevention treated layer (CL) 14 (oxide layer) by facilitating the occurrence of dehydration condensation of phosphoric acid even at low temperatures, in the outer cover material 10.

Examples of the aforementioned phosphoric acid and salts thereof include orthophosphoric acid, pyrophosphoric acid, metaphosphoric acid and alkaline metal or ammonium salts thereof. In particular, condensed phosphoric acids such as trimetaphosphoric acid, tetrametaphosphoric acid or hexametaphosphoric acid as well as alkaline metal salts or ammonium salts thereof are preferable for expressing function in the outer cover material 10. In addition, in consideration of dry film formability (drying capacity, heat capacity) when forming the corrosion prevented treated layer (CL) 14 composed of a rare earth oxide by various coating methods using the aforementioned sol of a rare earth oxide, a sodium salt is more preferable from the viewpoint of superior dehydration condensation properties at low temperatures. A water-soluble salt is preferable as a phosphoric acid salt.

The blending ratio of phosphoric acid (or a salt thereof) to cerium oxide is preferably 1 part by weight to 100 parts by weight based on 100 parts by weight of cerium oxide. If the aforementioned blending ratio is equal to or greater than 1 part by weight based on 100 parts by weight of cerium oxide, the cerium oxide sol becomes more stable and the function of the outer cover material 10 is improved. The aforementioned blending ratio is more preferably 5 parts by weight or more based on 100 parts by weight of cerium oxides. In addition, if the aforementioned blending ratio is equal to or less than 100 parts by weight based on 100 parts by weight of cerium oxide, a decrease in function of the cerium oxide sol is easily inhibited. The aforementioned blending ratio is more preferably 50 parts by weight or less and even more preferably 20 parts by weight or less based on 100 parts by weight of cerium oxide.

Since the corrosion prevention treated layer (CL) 14 formed by the aforementioned rare earth oxide sol consists of an aggregate of inorganic particles, there is the risk of a decrease in the cohesion of the layer per se even after going through a dry curing step. Therefore, the corrosion prevention treated layer (CL) 14 in this case is preferably conjugated by an anionic polymer or cationic polymer as indicated below in order to supplement cohesion.

An example of the anionic polymer is a polymer having a carboxyl group, specific examples of which include poly(meth)acrylic acid (or a salt thereof) and copolymers obtained by copolymerizing poly(meth)acrylic acid as a main component thereof.

Examples of copolymerizing components of the aforementioned copolymers include alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth) acrylamide, N-alkyl (meth) acrylamide, N,N-dialkyl (meth)acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy (meth)acrylamide, N,N-dialkoxy (meth)acrylamide (of which examples of alkoxy groups include a methoxy group, ethoxy group, butoxy group and isobutoxy group), N-methylol (meth)acrylamide or N-phenyl (meth)acrylamide; hydroxyl group-containing monomers such as 2-hydroxyethyl (meth)acrylate or 2-hydroxypropyl (meth)acrylate; glycidyl group-containing monomers such as glycidyl (meth)acrylate or allylglycidyl ether; silane-containing monomers such as (meth)acryloxypropyl trimethoxysilane or (meth)acryloxypropyl triethoxysilane; and isocyanate group-containing monomers such as (meth)acryloxypropyl isocyanate.

These anionic polymers fulfill the role of improving the stability of the corrosion prevention treated layer (CL) 14 (oxide layer) obtained using the rare earth element oxide sol. This is achieved by the effect of protecting a hard, brittle oxide with an acrylic-based resin component as well as the effect of capturing (by functioning as an cation catcher) ionic contaminants (and particularly sodium ions) derived from phosphates contained in the rare earth oxide sol. In other words, if alkaline metal ions such as sodium ions and alkaline earth metal ions in particular are contained in the corrosion prevention treated layer (CL) 14 obtained using the rare earth oxide sol, the corrosion prevention treated layer (CL) 14 is susceptible to deterioration starting at locations containing those ions. Consequently, the resistance of the corrosion prevention treated layer (CL) 14 is improved as a result of the anionic polymer immobilizing sodium ions contained in the rare earth oxide sol.

As a result of combining an anionic polymer and a rare earth element oxide sol, the corrosion prevention treated layer (CL) 14 has corrosion prevention performance that is equal to that of the corrosion prevention treated layer (CL) 14 formed by carrying out chromate treatment on aluminum foil. The anionic polymer preferably has a structure in which an essentially water-soluble polyanionic polymer is crosslinked. Examples of crosslinking agents used to form this structure include compounds having an isocyanate group, glycidyl group, carboxyl group or oxazoline group.

Examples of compounds having an isocyanate group include diisocyanates such as tolylene diisocyanate, xylylene diisocyanate or hydrogenation products thereof, hexamethylene diisocyanate, 4,4'-diphenylmethane diisocyanate or hydrogenation products thereof, or isophorone diisocyanate; polyisocyanates such as adducts obtained by reacting these isocyanates with a polyvalent alcohol such as trimethylolpropane, biurets obtained by reacting with water, or trimers in the form of isocyanurates; as well as block polyisocyanates obtained by forming blocks of these polyisocyanates with alcohols, lactams or oximes and the like.

Examples of compounds having a glycidyl group include epoxy compounds obtained by allowing epichlorhydrin to act on glycols such as ethylene glycol, diethylene glycol, triethylene glycol, polyethylene glycol, propylene glycol, 1,4-butanediol, 1,6-hexanediol or neopentyl glycol; epoxy compounds obtained by allowing epichlorhydrin to act on polyvalent alcohols such as glycerin, polyglycerin, trimethylolpropane, pentaerythritol or sorbitol; and epoxy compounds obtained by allowing epichlorhydrin to act on dicarboxylic acids such as phthalic acid, terephthalic acid, oxalic acid or adipic acid.

Examples of compounds having a carboxyl group include various types of aliphatic or aromatic dicarboxylic acids. In addition, poly(meth)acrylic acid and alkaline (earth) metal salts of poly(meth)acrylic acid may also be used.

Examples of compounds having an oxazoline group include low molecular weight compounds having two or more oxazoline units, or in the case of using a polymerizable monomer in the manner of isopropenyl oxazoline, copolymers obtained by copolymerizing an acrylic-based monomer such as (meth)acrylic acid, alkyl (meth)acrylic acid ester or hydroxyalkyl (meth)acrylic acid ester.

In addition, a crosslinking point may be siloxane-bonded to an anionic polymer by selectively reacting an amine and a functional group in the manner of a silane coupling agent. In this case, examples of compounds that can be used include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane and γ-isocyanatopropyltriethoxysilane. In particular, epoxysilanes, aminosilanes and isocyanate silanes are preferable in consideration of reactivity with the anionic polymer or copolymer thereof.

The ratio of these crosslinking agents to the anionic polymer is preferably 1 part by weight to 50 parts by weight and more preferably 10 parts by weight to 20 parts by weight based on 100 parts by weight of the anionic polymer. If the ratio of the crosslinking agent is equal to or greater than 1 part by weight based on 100 parts by weight of the anionic polymer, a crosslinked structure is formed with sufficient ease. If the ratio of the crosslinking agent is equal to or less than 50 parts by weight based on 100 parts by weight of the anionic polymer, the pot life of a coating liquid improves.

There are no particular limitations on the aforementioned crosslinking agents, and the method used to crosslink the anionic polymer may be a method consisting of the formation of ionic crosslinks using a titanium or zirconium compound.

Examples of cationic polymers include polyethylene imine, ionic polymer complexes composed of polyethylene imine and a polymer having carboxylic acid, primary amine grafted acrylic resin in which a primary amine is grafted to an acrylic backbone, polyamines or derivatives thereof, and aminophenol.

Examples of polymers having carboxylic acid that forms an ionic polymer complex with polyethylene imine include polycarboxylic acids (salts) such as polyacrylic acid or an ionic salt thereof, copolymers in which a co-monomer has been introduced therein, and polysaccharides having a carboxyl group such as carboxymethyl cellulose or an ionic salt thereof. Examples of polyallylamines include homopolymers and copolymers such as allylamines, allylamine amide hydrochloride, diallylamines or dimethylallylamine. These amines may be in the form of free amines or may be stabilized by acetic acid or hydrochloric acid. In addition, maleic acid or sulfur dioxide and the like may be used as copolymer components. Moreover, types imparted with thermal crosslinkability by partial methoxylation of a primary amine can also be used, and aminophenol can also be used. Allylamines and derivatives thereof are particularly preferable.

Cationic polymers are compounds that are able to impart electrolyte resistance and hydrofluoric acid resistance. This is presumed to be the result of inhibiting damage to the aluminum foil by capturing fluorine ions with cationic groups (functioning as an anion catcher).

The aforementioned cationic polymers are extremely preferable materials from the viewpoint of improving adhesion as well. In addition, since cationic polymers are water-soluble in the same manner as the aforementioned anionic polymers, they are preferably allowed to form a crosslinked structure, and by using crosslinking agents having various types of functional groups listed as examples in the section on anionic polymers, water resistance can be imparted to the cationic polymer. In this manner, since cationic polymers are also able to form a crosslinked structure, in the case of using a rare earth metal oxide solid for the corrosion prevention treated layer (CL) 14, a cationic polymer may be used for the protective layer thereof instead of using an anionic polymer.

There are no particular limitations on the combination of components in a coating agent used to form the aforementioned coated type of corrosion prevention treated layer (CL) 14, and examples thereof include the combinations of (1) to (7) indicated below:

(1) rare earth oxide sol only;
(2) anionic polymer only;
(3) cationic polymer only;
(4) layered compound consisting of rare earth oxide and anionic polymer;
(5) layered compound consisting of rare earth oxide and cationic polymer;
(6) multilayered laminate obtained by forming a layered compound using a rare earth oxide and anionic polymer followed by further laminating a cationic polymer; and,
(7) multilayered laminated obtained by forming a layered compound using a rare earth oxide and a cationic polymer followed by further laminating an anionic polymer.

In the case of using an adhesive resin in the second adhesive layer (AD-2) to be subsequently described, the combination of (5) or (6) above is preferable from the viewpoint of improving adhesion.

In addition, the corrosion prevention treated layer (CL) 14 is not limited to the aforementioned layers. For example, the corrosion prevention treated layer (CL) 14 may also be formed using a treatment agent incorporating phosphoric acid and a chromium compound in a resin binder (such as aminophenol) in the manner of a known technology in the form of chromate coating. The use of such a treatment agent enables the formation of a layer that is provided with both a corrosion prevention function and adhesion. In addition, compound treatment may also be used that uses the aforementioned cationic polymer or anionic polymer in the aforementioned degreasing treatment, hot water modification treatment, anodic oxidation treatment, chemical conversion treatment or a combination thereof in order to improve adhesion. In addition, a layer consisting of a cationic polymer or anionic polymer may be further laminated on a layer formed by the aforementioned treatment to form a multilayer structure. In addition, a layer can be obtained that is provided with both a corrosion prevention function and adhesion by using a coating agent in which a rare earth oxide sol and polycationic polymer or polyanionic polymer have been preliminarily incorporated into a single liquid, although the stability of the coating liquid must be taken into consideration.

The weight per unit surface area of the corrosion prevention treated layer (CL) 14 is preferably 0.005 mg/m$^2$ to 0.200 mg/m$^2$ and more preferably 0.010 mg/m$^2$ to 0.100 mg/m$^2$. If the aforementioned weight per unit surface area is 0.005 mg/m$^2$ or more, a corrosion prevention function is easily imparted to the aluminum foil layer (AL) 13. In addition, even if the aforementioned weight per unit surface area exceeds 0.200 mg/m$^2$, there is little change in corrosion prevention function. On the other hand, in the case of using a rare earth oxide sol, heat-curing during drying may become inadequate if the coated film is excessively thick, thereby resulting in the risk of a decrease in cohesion. Furthermore, the thickness of the corrosion prevention treated layer 14 can be converted from the specific gravity thereof.

In order to allow a corrosion prevention treated layer subjected to chemical conversion treatment as exemplified by chromate treatment to form an inclined structure with aluminum foil, the aluminum foil is subjected to treatment using a chemical conversion coating agent that incorporates hydrofluoric acid, hydrochloric acid, nitric acid, sulfuric acid or a salt thereof in particular, followed by forming a chemical conversion treated layer on the aluminum foil by allowing a chromium- or non-chromium-based compound to act thereon. However, since the aforementioned chemical conversion treatment uses an acid for the chemical conversion coating agent, this treatment is accompanied by exacerbation of the working environment and corrosion of coating devices. On the other hand, differing from chemical conversion treatment as exemplified by chromate treatment, the aforementioned coated type of corrosion prevention treated layer (CL) 14 is not required to form an inclined structure with the aluminum foil layer 13. Consequently, the properties of the coating agent are not subjected to restrictions such as being acidic, alkaline or neutral, thereby making it possible to realize a favorable working environment. In addition, the coated type of corrosion prevention treated layer (CL) 14 is also preferable since chromate treatment using a chromium compound requires an alternative in terms of environmental health, as indicated by the fact that hexavalent chromium has been treated as an environmentally hazardous substance in recent years as in the Rohs and REACH regulations in Europe, and in consideration of applications to electric vehicles designed on the basis of environmental considerations in particular.

<Second Adhesive Layer (AD-2)>

The second adhesive layer (AD-2) 15 is a layer for adhering the corrosion prevention treated layer (CL) 14 and the sealant layer (SL) 16. The second adhesive layer (AD-2) 15 is formed with an adhesive or adhesive resin. In other words, the second adhesive layer (AD-2) 15 is formed with an adhesive resin in the case of a configuration using thermal lamination or heat treatment, or the second adhesive layer (AD-2) 15 is formed with an adhesive in the case of a configuration using dry lamination.

Examples of the adhesive resin include modified polyolefins (to be referred to as "modified polyolefin resin (A)") obtained by graft modification with one or more types of unsaturated carboxylic acid derivative component selected from the group consisting of unsaturated carboxylic acids, unsaturated carboxylic acid anhydrides and unsaturated carboxylic acid esters. The modified polyolefin resin (A) imparts adhesion by utilizing reactivity between the grafted unsaturated carboxylic acid derivative component and polymers containing various types of metals or functional groups.

Examples of the aforementioned polyolefin resins include low density polyethylene, medium density polyethylene, high density polyethylene, ethylene-α-olefin copolymers, homo-, block- or random polypropylenes, and propylene-α-olefin copolymers.

Examples of unsaturated carboxylic acids include acrylic acid, methacrylic acid, maleic acid, fumaric acid, itaconic acid, citraconic acid, tetrahydrophthalic acid and bicyclo[2.2.1]hept-2-ene-5,6-dicarboxylic acid.

Examples of unsaturated carboxylic acid anhydrides include maleic anhydride, itaconic anhydride, citraconic anhydride, tetrahydrophthalic anhydride and bicyclo[2.2.1]hept-2-ene-5,6-dicarboxylic acid anhydride.

Examples of unsaturated carboxylic acid esters include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate and dimethyl bicyclo [2.2.1] hept-2-ene-5,6-dicarboxlyate.

The modified polyolefin resin (A) can be produced by graft polymerization (graft modification) of the aforementioned unsaturated carboxylic acid derivative component with the polyolefin resin serving as the base in the presence of a radical initiator.

The ratio of the aforementioned unsaturated carboxylic acid derivative component is preferably 0.2 parts by weight to 100 parts by weight based on 100 parts by weight of the polyolefin resin serving as the base.

The reaction temperature is preferably 50° C. to 250° C. and more preferably 60° C. to 200° C.

Although suitably set according to the production method, in the case of a molten graft reaction using a twin screw extruder, the residence time in the extruder is preferably 2 minutes to 30 minutes and more preferably 5 minutes to 10 minutes.

Furthermore, graft modification can be carried out under conditions of either normal pressure or under pressurization.

Examples of the radical initiator used in graft modification include organic peroxides such as alkyl peroxides, aryl peroxides, acyl peroxides, ketone peroxides, peroxyketals, peroxycarbonates, peroxyesters and hydroperoxides.

These organic peroxides can be suitably selected according to the aforementioned reaction conditions of reaction temperature and reaction time. For example, in the case of a molten graft polymerization using a twin-screw extruder, an alkyl peroxide, peroxyketal or peroxyester is preferable, and more specifically, di-t-butyl peroxide, 2,5-dimethyl-2,5-di-t-butylperoxide-3-benzene or dicumyl peroxide is preferable.

A modified polyolefin resin modified by maleic anhydride is preferable for the modified polyolefin resin (A). Suitable examples thereof include Admer manufactured by Mitsui Chemicals Inc., Modic manufactured by Mitsubishi Chemical Corp., and Adtex manufactured by Nippon Polyethylene Corp.

The modified polyolefin resin (A) contained in an adhesive resin layer AR (16) may consist of one type or two or more types.

In addition, residual stress generated during lamination can be released and viscoelastic adhesion of the second adhesive layer (AD-2) 15 can be improved by incorporating various types of thermoplastic elastomers in the modified polyolefin resin (A).

Preferable examples of the aforementioned thermoplastic elastomers include Tafiner manufactured by Mitsui Chemicals Inc., Catalloy manufactured by Montell Co., Notio manufactured by Mitsui Chemicals Inc. as well as Tafthren manufactured by Sumitomo Chemical Co., Ltd., styrene-based elastomers, and particularly hydrogenated styrene-based elastomers (such as Tuftec manufactured by Asahi Kasei Chemicals Corp., Septon/Hybrar manufactured by Kuraray Co., Ltd., Dynalon manufactured by JSR Corp., Espolex manufactured by Sumitomo Chemical Co., Ltd., and Kraton G manufactured by Kraton Polymers llc.).

In addition, various types of additives may also be incorporated in the second adhesive layer (AD-2) 15 formed by the modified polyolefin resin (A), such as a flame retardant, slipping agent, anti-blocking agent, antioxidant, photostabilizer or pressure-sensitive adhesion promoter.

Examples of adhesive used in the second adhesive layer (AD-2) 15 of a dry laminate configuration are the same as those listed as examples for the first adhesive layer (AD-1) 12. In particular, the composition of the adhesive is preferably designed so as to use a primary agent having a skeleton that is resistant to hydrolysis or so as to improve crosslink density and the like from the viewpoint facilitating inhibition of swelling attributable to electrolytic solution and hydrolysis attributable to hydrofluoric acid.

Examples of methods used to improve crosslink density of an adhesive include methods allowing the obtaining of a dimer fatty acid or ester thereof, hydrogenation product of a dimer fatty acid or ester thereof, reduced glycol of a dimer fatty acid or ester thereof or reduced glycol of a hydrogenation product of a dimer fatty acid or ester thereof, and a polyester polydiol composed of a diol compound. According to these methods, crosslink density is improved by highly bulky hydrophobic units of the dimer fatty acid.

Dimer fatty acids refer to compounds obtained by dimerization of various types of unsaturated fatty acids, an examples of the structure thereof include acyclic types, monocyclic types, polycyclic types and aromatic ring types. There are no particular limitations on the dimer structure of the dimer fatty acid serving as raw material in the polyester polyol used in the second adhesive layer (AD-2) 15. In addition, there are no particular limitations on the type of unsaturated fatty acid used as a starting substance of the dimer fatty acid.

Examples of unsaturated fatty acids include mono-unsaturated fatty acids such as crotonic acid, myristoleic acid, palmitoleic acid, oleic acid, elaidic acid, vaccenic acid, gadoleic acid, eicosenoic acid, erucic acid or nervonic acid; di-unsaturated fatty acids such as linoleic acid, eicosadienoic acid or docosaenoic acid; tri-unsaturated fatty acids such as linolenic acid, pinolenic acid, eleostearic acid, mead acid, dihomo-γ-linolenic acid or eicosatrienoic acid; tetra-unsaturated fatty acids such as stearidonic acid, arachidonic acid, eicosatetraenoic acid or adrenic acid; penta-unsaturated fatty acids such as bosseopentaenoic acid, eicosapentaenoic acid, Osbond acid, clupanodonic acid or tetracosapentenoic acid; and hexa-unsaturated fatty acids such as docosahexaenoic acid or nisinic acid.

There are no particular limitations on the combinations of unsaturated fatty acids subjected to dimerization in the dimer fatty acid, and may be the same unsaturated fatty acids or different unsaturated fatty acids.

Diol compounds listed as examples of diol compounds in the explanation of the polyester polyol of the first adhesive layer (AD-1) 12 can be used for the diol compound.

In addition, in the case of improving crosslink density with the aforementioned dimer fatty acids, a dibasic acid may be introduced that is normally used in the production of polyester polyols. Dibasic acids listed as examples of dibasic acids in the explanation of the polyester polyol of the first adhesive layer (AD-1) 12 can be used for the dibasic acid.

In addition, a polyester urethane polyol, in which hydroxyl groups on both ends of a polyester polyol for which crosslink density has been improved by the aforementioned method have undergone chain elongation by a polyisocyanate compound, is preferable for the adhesive of the second adhesive layer (AD-2) 15. Polyisocyanate compounds listed as examples of polyisocyanate compounds in the explanation of the polyester urethane polyol of the first adhesive layer (AD-1) 12 can be used for the polyisocyanate compound, and one or more types selected from the group consisting of crude tolylene diisocyanate, crude diphenylmethane diisocyanate and polymeric diphenylmethane diisocyanate are preferable.

Polyisocyanate compounds listed as examples of polyisocyanate compounds in the explanation of the first adhesive layer (AD-1) 12 can be used as curing agents in the adhesive that forms the second adhesive layer (AD-2) 15 and from the viewpoint of improving electrolyte resistance (and especially solubility and swelling with respect to electrolytic solution), one or more types of polyisocyanates (to be referred to as "polyisocyanate (B)") selected from the group consisting of crude tolylene diisocyanate, crude diphenylmethane diisocyanate and polymeric diphenylmethane diisocyanate, or an adduct of this polyisocyanate (B), are preferable. As a result, in addition to improving crosslink density and reducing solubility and swelling with respect to electrolytic solution, the second adhesive layer (AD-2) 15 improves adhesion by improving urethane group concentration.

In addition, polyisocyanate (B) is preferably used as a chain extender in the case of using a polyester urethane polyol obtained by chain extension of a polyester polyol for the primary agent.

The ratio of curing agent in the adhesive that forms the second adhesive layer 15 (AD-2) is preferably 1 part by weight to 100 parts by weight and more preferably 5 parts by weight to 50 parts by weight based on 100 parts by weight of the primary agent. If the aforementioned ratio of curing agent is equal to or greater than the lower limit of the aforementioned ranges, adhesion and electrolyte resistance improve. If the aforementioned ratio of curing agent is equal to or less than the upper limit of the aforementioned ranges or if the ratio is 100 parts by weight or less, detrimental effects of isocyanate groups of unreacted curing agent, such as detrimental effects on hardness of the second adhesive layer (AD-2) 15, are easily inhibited.

In addition, in the case of forming the second adhesive layer (AD-2) 15 with an adhesive, a carbodiimide compound, oxazoline compound, epoxy compound, phosphorous compound or silane coupling agent and the like may be incorporated to promote adhesion in the same manner as the first adhesive layer (AD-1) 12.

<Sealant Layer (SL) 16>

The sealant layer (SL) 16 is a layer affixed to the aluminum foil layer (AL) 13 on which the corrosion prevention treated layer (CL) 14 is formed with the second adhesion layer (AD-2 15 interposed there between, and imparts sealing properties in the outer cover material 10 by heat sealing.

Examples of components that compose the sealant layer (SL) 16 include polyolefin resins such as low density polyethylene, medium density polyethylene, high density polyethylene, ethylene-α-olefin copolymers, homo-, block- or random polypropylenes or propylene-α-olefin copolymers, ethylene-vinyl acetate copolymers, ethylene-(meth)acrylic acid copolymers and esterification products or ionic crosslinking products thereof.

The sealant layer (SL) 16 may be in the form of a single layer composed of one type of the aforementioned components or a blended material composed of two or more types, or may be in the form of a multilayer structure in accordance with other performance requirements of the sealant. Examples of the sealant layer (SL) 16 having a multilayer structure include sealant layers interposed with a resin having gas impermeability, such as a partially saponified or completely saponified ethylene-vinyl acetate copolymer or partially saponified or completely saponified polyvinyl acetate copolymer.

<Slipping Agent>

Slippage with the metal mold used to carry out deep drawing also has an effect on moldability of the outer cover material 10. Consequently, a slipping agent is preferably imparted to one or both of the base material layer (SB) 11 and sealant layer (SL) 16 in order reduce the coefficient of friction of the outer cover material 10. Examples of slipping agents include silicone, polymeric wax and fatty acid amides (including unsaturated fatty acid amides such as erucic amide.

Examples of methods used to impart the slipping agent include coating by wet coating, impregnating the slipping agent in the sealant layer (SL) 16, and deposition using bleed out phenomenon.

(Production Method)

The following provides an explanation of a production method of the outer cover material 10. However, the production method of the outer cover material 10 is not limited to the method indicated below.

The production method of the outer cover material 10 has the three steps (I) to (III) indicated below:

(I) a step for forming the corrosion prevention treated layer (CL) 14 on the aluminum foil layer 13 (AL);

(II) a step for laminating the base material (SB) 11 through the first adhesive layer (AD-1) 12 onto the aluminum foil layer (AL) 13 on the opposite side from the side on which the corrosion prevention treated layer (CL) 14 has been formed; and, (III) a step for laminating the sealant layer (SL) 16 through the second adhesive layer (AD-2) 15 on the aluminum foil layer (AL) 13 on the side of the corrosion prevention treated layer 14 (CL).

Step (I):

The corrosion prevention treated layer (CL) 14 is formed on one side of the aluminum foil layer (AL) 13 by carrying out degreasing treatment, hot water modification treatment, anodic oxidation treatment, chemical conversion treatment or by applying a coating agent having corrosion prevention performance.

Examples of methods used to carry out degreasing treatment include annealing, spraying and immersion.

An example of a method used to carry out hot water modification treatment of anodic oxidation treatment is immersion.

The method used to carry out chemical conversion treatment can be selected from among immersion, spraying and coating corresponding to the type of chemical conversion treatment.

Various types of methods such as gravure coating, reverse coating, roll coating or bar coating can be employed as the method for coating the coating agent having corrosion prevention performance.

The amount of coating agent applied is preferably within a range that satisfies the aforementioned weight per unit surface area of the corrosion prevention treated layer (CL) 14. In addition, in the case of requiring dry curing, drying curing can be carried out within a range of 60° C. to 300° C. for the substrate temperature corresponding to the drying conditions used when drying the corrosion prevention treated layer (CL) 14.

Step (II):

The base material layer (SB) 11 is laminated by a method such as dry lamination, non-solvent lamination or wet lamination using an adhesive that forms the first adhesive layer (AD-1) 12 on the side of the aluminum foil layer (AL) 13 on the opposite side from the side on which the corrosion prevention treated layer (CL) 14 has been formed. The dried coated amount of the adhesive is preferably 1 g/m$^2$ to 10 g/m$^2$ and more preferably 3 g/m$^2$ to 7 g/m$^2$.

Instep (II), aging treatment may also be carried out within a range of room temperature to 100° C. in order to promote adhesion.

Step (III):

In the case of forming the second adhesive layer (AD-2) 15 with an adhesive, the sealant layer is laminated by a method such as dry lamination, non-solvent lamination or wet lamination onto the side having the corrosion prevention treated layer (CL) 14 of a laminate obtained by laminating the base material layer (SB) 11, the first adhesive layer (AD-1) 12, the aluminum foil layer (AL) 13 and the corrosion prevention treated layer (CL) 14 in that order. The dried coated amount of the adhesive is preferably 1 g/m$^2$ to 10 g/m$^2$ and more preferably 3 g/m$^2$ to 7 g/m$^2$. Aging treatment may also be carried out in this case as well within a range of room temperature to 100° C. in order to promote adhesion in the same manner as step (II).

In addition, in the case of forming the second adhesive layer (AD-2) 15 with an adhesive resin, the sealant layer (SL) 16 is laminated through the adhesive resin on the side having the corrosion prevention treated layer (CL) 14 of the aforementioned laminate by sandwich lamination using an extrusion laminator. In this case, heat treatment is preferably carried out on a laminate composed of the base material layer (SB) 11, the first adhesive layer (AD-2) 12, the aluminum foil layer (AL) 13, the corrosion prevention treated layer (CL) 14, the second adhesive layer (AD-2) 15 and the sealant layer (SL) 16. As a result of this heat treatment, adhesion is improved between the aluminum foil layer (AL) 13, the corrosion prevention treated layer (CL) 14, the second adhesive layer (AD-2) 15 and the sealant layer (SL) 16, thereby improving electrolyte resistance and hydrofluoric acid resistance.

From the viewpoint of productivity and handling ease, the method used to carry out heat treatment preferably consists of passing through a drying oven or baking oven set to a high temperature (such as 100° C. or higher), thermal lamination (thermocompression bonding), or containing in a Yankee dryer (heat dryer).

The heat treatment temperature is preferably set so that the maximum attainable temperature of the aforementioned laminate is within the range of room temperature to a temperature 20° C. higher than the melting point of the sealant layer 16, or preferably set so that the maximum attainable temperature of the aforementioned laminate is within the range of the melting point of the adhesive resin to the melting point of the sealant layer 16.

Treatment time varies according to heat treatment temperature, and a longer treatment time is preferable in the case of a low heat treatment temperature, while a shorter treatment time is preferable in the case of a high heat treatment temperature.

The outer cover material 10 is obtained according to the steps (I) to (III) explained above.

Furthermore, the production method of the outer cover material 10 is not limited to a method consisting of sequentially carrying out the aforementioned steps (I) to (III). For example, step (I) may be carried out after carrying out step (II). In addition, a corrosion prevention treated layer may be provided on both sides of the aluminum foil layer. In the case of forming the corrosion prevention treated layer on one side, it is formed on the side of the second adhesive layer (AD-2). In addition, step (II) may be carried out after carrying out step (III).

The lithium ion battery outer cover material of the present invention as explained above has superior moldability since the base material layer has the aforementioned drawn film A.

Furthermore, the outer cover material of the present invention is not limited to the aforementioned outer cover material 10. For example, the corrosion prevention treated layer may at least be provided on the aluminum foil layer on the side of the sealant layer, or may be provided on both sides of the aluminum foil layer.

EXAMPLES

Although the following provides a detailed explanation of the present invention through examples thereof, the present invention is not limited by the following descriptions.

Examples 1 to 9 and Comparative Examples 1 to 3

[Materials Used]

The materials used in the present examples are as indicated below.

(Base Material Layer 11)

The following film base materials deposited by casting were used as base materials.

Base Material SB-1: Biaxially drawn polyamide film (Unitika Ltd., ON, thickness: 25 μm)

Base Material SB-2: Biaxially drawn polyamide film (Unitika Ltd., ON-U, thickness: 25 μm)

Base Material SB-3: Biaxially drawn polyamide film (Unitika Ltd., ON-P, thickness: 25 μm)

Base Material SB-4: Biaxially drawn polyamide film (Unitika Ltd., ON, thickness: 15 μm)

Base Material SB-5: Biaxially drawn polyamide film (Unitika Ltd., ON-U, thickness: 15 μm)

Base Material SB-6: Biaxially drawn polyamide film (Unitika Ltd., ON-P, thickness: 15 μm)

Base Material SB-7: Biaxially drawn polyester film (Unitika Ltd., PET, thickness: 12 μm)

Base Material SB-8: Biaxially drawn polyamide film (Mitsubishi Plastics Inc., SNR, thickness: 25 μm)

Base Material SB-9: Biaxially drawn polyamide film (Mitsubishi Plastics Inc., SNR, thickness: 15 μm)

Tensile strain properties (MD direction/TD direction only) of base materials SB-1 to SB-3 and SB-8 as measured according to JIS-K7127 are shown in Table 1.

Although base material SB-1 is a material having good balance in both the MD direction and TD direction, it has large directivity (anisotropy) of elasticity at 45° and 135°. In the case of base materials SB-2 and SB-3, in looking at the ratio of minimum values to maximum values in each direction, the value for elasticity is 56% to 60%, and when looking at the ratio of minimum values to maximum values in each direction for strength, the value is 70%, thus indicating this to be a material having large directivity of mechanical strength in the MD direction and TD direction. The base materials SB-4 to SB-6 and SB-9 have the same tensile properties as base materials SB-1 to SB-3 and SB-8 with the exception of having different thicknesses.

The base materials SB-2, SB-3, SB-5, SB-6, SB-8 and SB-9 are examples of the film base material (A).

TABLE 1

|  |  | Elasticity to yield point (α1) | Elasticity to rupture point (α2) | (α2) − (α1) | Stress at rupture point (MPa) |
| --- | --- | --- | --- | --- | --- |
| SB-1 | MD direction | 25 | 95 | 70 | 220 |
|  | TD direction | 25 | 95 | 70 | 230 |
| SB-2 | MD direction | 20 | 150 | 130 | 220 |
|  | TD direction | 15 | 85 | 70 | 320 |
| SB-3 | MD direction | 15 | 150 | 135 | 230 |
|  | TD direction | 15 | 90 | 75 | 330 |

TABLE 1-continued

|  |  | Elasticity to yield point (α1) | Elasticity to rupture point (α2) | (α2) − (α1) | Stress at rupture point (MPa) |
| --- | --- | --- | --- | --- | --- |
| SB-8 | MD direction | 10 | 110 | 100 | 260 |
|  | TD direction | 15 | 90 | 75 | 300 |

(First Adhesive Layer 12)

Adhesive AD-1: Polyurethane-based adhesive incorporating a tolylene diisocyanate adduct-based curing agent in a polyester polyol-based primary agent (Toyo Ink Co., Ltd.)

(Aluminum Foil Layer 13)

Aluminum Foil AL-1: Soft aluminum foil 8079 having a thickness after annealing and degreasing treatment of 40 μm (Toyo Aluminum K.K.)

(Corrosion Prevention Treated Layer 14)

Treatment Agent CL-1: Sodium polyphosphate-stabilized cerium oxide sol adjusted to a solid concentration of 10% by weight using distilled water for the solvent. Amount of phosphate made to be 10 parts by weight based on 100 parts by weight of cerium oxide.

Treatment Agent CL-2: Composition composed of 90% by weight of polyacrylic acid ammonium salt (Toagosei Co., Ltd.) and 10% by weight of acrylic-isopropylenyl oxazoline copolymer (Nippon Shokubai Co., Ltd.) adjusted to a solid concentration of 5% by weight using distilled water for the solvent.

Treatment Agent CL-3: Composition composed of 90% by weight of polyallylamine (Nitto Boseki Co., Ltd.) and 10% by weight of polyglycerol polyglycidyl ether (Nagase Chemtex Corp.) adjusted to a solid concentration of 5% by weight using distilled water for the solvent.

Treatment Agent CL-4: Chemical conversion coating agent prepared by adding chromium fluoride ($CrF_3$) to a water-soluble phenol resin (Sumitomo Bakelite Co., Ltd.), adjusted to a solid concentration of 1% by weight using an aqueous phosphoric acid solution having a concentration of 1% as solvent, and adjusting the concentration to 10 mg/$m^2$ as the amount of Cr present in the final dry coating.

(Second Adhesive Layer 15)

Adhesive AD-2: Adhesive containing a primary agent composed of a polyester polyol consisting of a hydrogenated dimer fatty acid and diol (trade name: "SS-051", Mitsui Chemicals Inc.), and a curing agent composed of a mixture of crude tolylene diisocyanate and crude (or polymeric) diphenylmethane diisocyanate or adducts thereof (trade name: "SK-01", Mitsui Chemicals Inc.).

Adhesive Resin AD-3: Modified polyolefin resin obtained by blending an elastomer composed of ethylene-α-olefin copolymer with modified random polypropylene (PP) obtained by graft modification of maleic anhydride to PP (Tm=approx. 135° C.) (Mitsui Chemicals Inc.).

(Sealant Layer 16)

Film SL-1: Multilayer film composed of two types and three layers consisting of random PP, block PP and random PP having a total thickness of 30 μm (Okamoto Co., Ltd.).

[Outer Cover Material Production Method]

Step (I):

The corrosion prevention treated layer 14 was provided on the side of the aluminum foil AL-1 filled with electrolytic solution by microgravure coating. The coated amount was set to 70 mg/$m^2$ to 100 mg/$m^2$ as the dry coated amount of the treatment agent (coating agent), and baking treatment was carried out in a drying unit at 150° C. to 250° C. corresponding to the type of treatment agent. The final dry coated amount was made to be 70 mg/m² to 100 mg/m² and baking treatment conditions were made to be within the range of 150° C. to 250° C. both in the case the formed corrosion prevention treated layer 14 consisted of a single layer and in the case of multiple layers.

Step (II):

The adhesive AD-1 was coated to a dry coated amount of 4 g/m² to 5 g/m² on the aluminum foil layer 13 provided with the corrosion prevention treated layer 14 on the side opposite from the side of the corrosion prevention treated layer 14 by gravure reverse coating, followed by layering each type of base material shown in Table 2 and laminating. Subsequently, the adhesive AD-1 was cured by carrying out aging treatment and the base material layer 11 was laminated through the first adhesive layer 12.

Step (III):

The outer cover material 1 having a configuration using dry lamination was produced by coating the adhesive AD-2 onto the laminate obtained in step (II) on the side of the corrosion prevention treated layer 14 by gravure reverse coating to a dry coated amount of 4 g/m² to 5 g/m², layering the film SL-1 and laminating, and curing the adhesive AD-2 by carrying out aging treatment to laminate the sealant layer 16 through the second adhesive 15.

The outer cover material 1 having a configuration using thermal lamination was produced by extrusion laminating the adhesive resin AD-3 onto the corrosion prevention treated layer 14 of the laminate obtained in step (II) using an extrusion laminator within a range of 260° C. to 300° C., sandwich laminating with the film SL-1, laminating the sealant layer 16 through the second adhesive layer 15, and subsequently carrying out thermocompression bonding by thermal lamination so that the temperature of the resulting laminate was in the vicinity of the melting point of the sealant layer 16 to securely adhere the corrosion prevention treated layer 14 and the second adhesive layer 15.

[Evaluation Methods]

(Evaluation of Deep-Drawing Formability)

Figure 2:
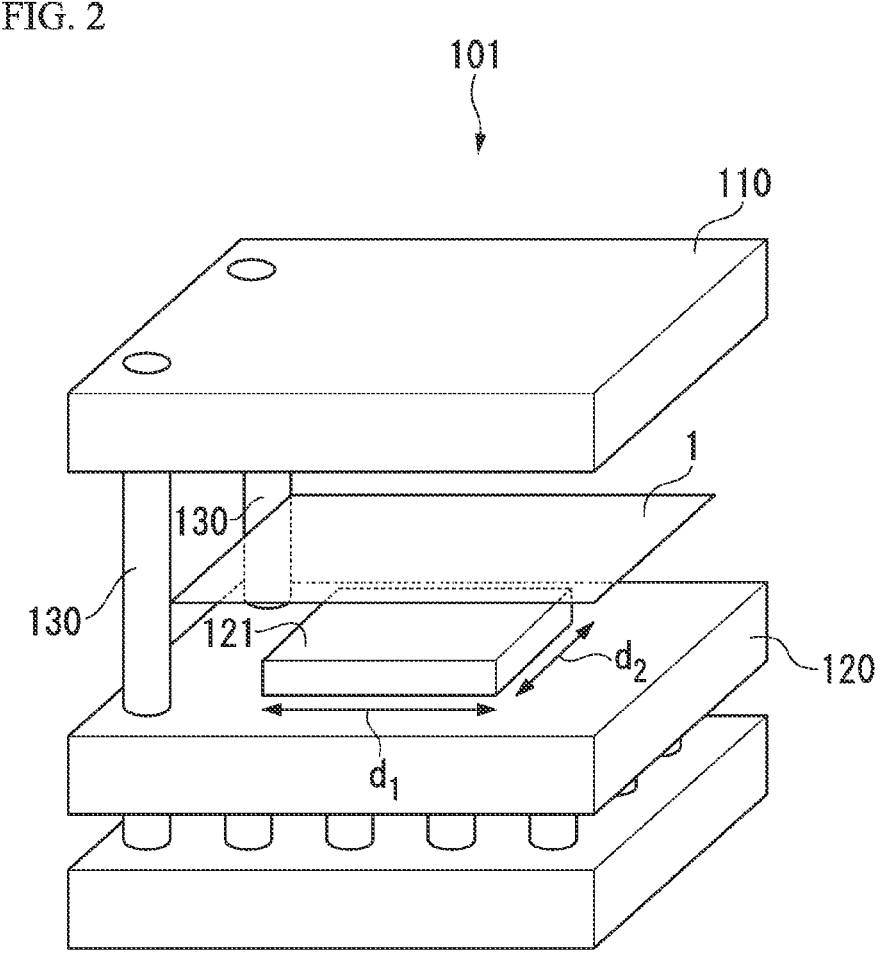
FIG. 2 is a perspective view showing a metal mold used for deep-drawing in an example.
Figure 3:
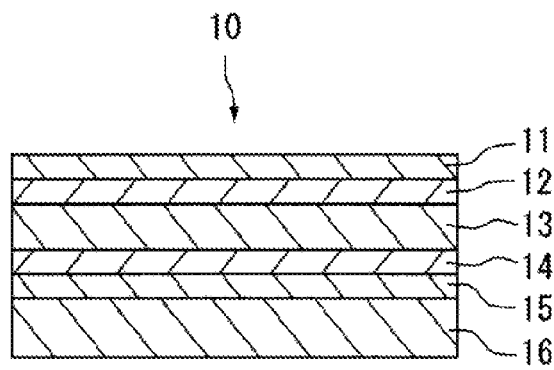
FIG. 3 is a cross-sectional view showing an example of the lithium ion battery outer cover material of the present invention.

The resulting outer cover materials were deep drawn with the metal mold 101 exemplified in FIG. 2 followed by evaluation of formability. The metal mold 101 had a female mold 110, a male mold 120 and air cylinders 130, and the dimensions of a die 121 of the male mold 120 consisted of a length $d_1$ of 60 mm and width $d_2$ of 40 mm.

The clamping pressure generated by the air cylinders 130 was 0.5 MPa to 0.8 MPa, and the stroke speed was 5 mm/sec. The draw depth was set to 4.75 mm, 5.00 mm, 5.25 mm, 5.50 mm, 5.75 mm or 6.00 mm, and forming was carried out 100 times in succession for each draw depth. The outer cover materials were evaluated by evaluating those for which the number of non-defectives in which pinholes or cracks had not formed in the outer cover material was 95 to 100 as "A", those for which the number of non-defectives was 90 to 94 as "B" and those in which the number of non-defectives was less than that as "C", and evaluating those outer cover materials evaluated as "B" or better for the result of forming at a draw depth of 5.50 mm or less as "○ (good)", and evaluating those evaluated as "C" for the result of forming at a draw depth of 5.50 mm or less as "× (poor)".

(Evaluation of Electrolyte Resistance)

Test pieces prepared by cutting out a strip measuring 100 mm long×15 mm wide from the outer cover materials obtained in each example were immersed in an electrolytic solution prepared by dissolving $LiPF_6$ (lithium hexafluorophosphate) in a mixture of ethylene carbonate, dimethyl carbonate and diethyl carbonate (weight ratio=1:1:1) to a concentration of 1.5 M, followed by evaluating appearance after storing for 24 hours (Evaluation A) or 4 weeks (Evaluation B) at 85° C. Outer cover materials for which there were no problems with appearance were evaluated as "○ (good)", while those in which separation occurred were evaluated as "× (poor)".

Examples 1 to 9 and Comparative Examples 1 to 3

Outer cover materials having the compositions shown in Table 2 were produced according to the production method described above followed by an evaluation of formability and electrolyte resistance.

TABLE 2

| | Composition | | | | | |
|---|---|---|---|---|---|---|
| | Base layer 11 | First adhesive layer 12 | Aluminum foil layer 13 | Corrosion prevention treated layer 14 | Second adhesive layer 15 | Sealant layer 16 |
| Ex. 1 | SB-2 | AD-1 | AL-1 | CL-1/CL-2 | AD-2 | SL-1 |
| Ex. 2 | SB-3 | AD-1 | AL-1 | CL-1/CL-2 | AD-2 | SL-1 |
| Ex. 3 | SB-7/SB-5 | AD-1 | AL-1 | CL-1/CL-2 | AD-2 | SL-1 |
| Ex. 4 | SB-7/SB-6 | AD-1 | AL-1 | CL-1/CL-2 | AD-2 | SL-1 |
| Ex. 5 | SB-7/SB-5 | AD-1 | AL-1 | CL-1/CL-2/CL-3 | AD-3 | SL-1 |
| Ex. 6 | SB-7/SB-6 | AD-1 | AL-1 | CL-1/CL-2/CL-3 | AD-3 | SL-1 |
| Ex. 7 | SB-7/SB-5 | AD-1 | AL-1 | CL-4/CL-3 | AD-3 | SL-1 |
| Ex. 8 | SB-8 | AD-1 | AL-1 | CL-1/CL-2 | AD-2 | SL-1 |
| Ex. 9 | SB-7/SB-9 | AD-1 | AL-1 | CL-1/CL-2/CL-3 | AD-3 | SL-1 |
| Comp. Ex. 1 | SB-1 | AD-1 | AL-1 | CL-1/CL-2 | AD-2 | SL-1 |
| Comp. Ex. 2 | SB-7/SB-4 | AD-1 | AL-1 | CL-1/CL-2 | AD-2 | SL-1 |
| Comp. Ex. 3 | SB-7/SB-4 | AD-1 | AL-1 | CL-1/CL-2/CL-3 | AD-3 | SL-1 |

Furthermore, in Table 2, "CL-1/CL-2" of the corrosion prevention treated layer 14 refers to first treating the aluminum foil layer AL-1 with treatment agent CL-1 followed by treating with treatment agent CL-2. This applies similarly to the descriptions of other examples of the corrosion prevention treated layer 14. In addition, "SB-7/SB-4" in the substrate layer 11 refers to a base material first obtained by laminating base material SB-7 and base material SB-4 using the same adhesive as adhesive AD-1, wherein the side having the base material SB-4 is on the side of the first adhesive layer 12. This applies similarly to the descriptions of other examples of the base material layer 11.

In Examples 5 to 7, Example 9 and Comparative Example 3, treatment was carried out with treatment agent CL-3 in order to impart adhesion to the corrosion prevented treated layer 14 and the second adhesive layer 15 with the adhesive resin.

The evaluation results of each example are shown in Table 3.

TABLE 3

| | Forming Depth [mm] | | | | | | Formability | Electrolyte Resistance Evaluation | |
|---|---|---|---|---|---|---|---|---|---|
| | 4.75 | 5.00 | 5.25 | 5.50 | 5.75 | 6.00 | Evaluation | A | B |
| Ex. 1 | A | A | A | A | B | C | ○ | ○ | Not evaluated |
| Ex. 2 | A | A | A | A | A | B | ○ | ○ | Not evaluated |
| Ex. 3 | A | A | A | B | C | C | ○ | ○ | ○ |
| Ex. 4 | A | A | A | A | B | C | ○ | ○ | ○ |
| Ex. 5 | A | A | A | B | C | C | ○ | ○ | ○ |
| Ex. 6 | A | A | A | A | B | C | ○ | ○ | ○ |
| Ex. 7 | A | A | A | A | B | C | ○ | ○ | ○ |
| Ex. 8 | A | A | A | A | A | B | ○ | ○ | Not evaluated |
| Ex. 9 | A | A | A | A | B | C | ○ | ○ | ○ |
| Comp. Ex. 1 | A | A | B | C | C | C | X | ○ | Not evaluated |
| Comp. Ex. 2 | A | B | C | C | C | C | X | ○ | ○ |
| Comp. Ex. 3 | A | B | C | C | C | C | X | ○ | ○ |

As shown in Table 3, the outer cover materials of Examples 1, 2 and 8 of the present invention having the base material layer 11 composed of a single layer film enabled favorable drawing at a deep draw depth of 0.50 mm to 0.75 mm in comparison with the outer cover material of Comparative Example 1 of the same composition with the exception of the base material layer 11. In addition, the outer cover materials of Examples 3 to 7 and 9 of the present invention having the base material layer 11 composed of a laminated film having a polyester film of inferior deep drawing also enabled favorable drawing at a deep draw depth of 0.50 mm to 0.75 mm in comparison with the outer cover materials of Comparative Examples 2 and 3 of the same composition with the exception of the base material layer 11. In hybrid vehicle and electric vehicle applications requiring particularly superior long-term reliability, there are cases in which a multilayer film configuration is required in which a polyester film, which is inferior in terms of deep drawing but has superior acid resistance, electrolyte resistance and scratch resistance, is provided on the outer layer of a polyamide film (film base material (A)). On the basis of the above results, superior deep-drawing formability was determined to be obtained even in this multilayer film configuration.

In addition, all of the outer cover materials having dry laminated configurations and thermal laminated configurations of Examples 1 to 6, 8 and 9 demonstrated superior long-term reliability comparable to Example 7 that underwent chromate treatment in the evaluation of electrolyte resistance.

Examples 10 to 19 and Comparative Examples 4 to 9

[Materials Used]

The materials used in the present examples are as indicated below.

(Base Material Layer 11)

The following film base materials deposited by casting were used as base materials.

Base Material SB-1: Biaxially drawn polyamide film (ON, Unitika Ltd., thickness: 25 μm)

Base Material SB-2: Biaxially drawn polyamide film (Nitto Boseki Co., Ltd., NAP, thickness: 25 μm)

Base Material SB-3: Biaxially drawn polyamide film (RX, Kohjin Co., Ltd., thickness: 25 μm)

Base Material SB-4: Biaxially drawn polyamide film (N1152, Nitto Boseki Co., Ltd., thickness: 25 μm)

Base Material SB-5: Biaxially drawn polyamide film (G-100, Idemitsu Petrochemical Co., Ltd., thickness: 25 μm)

Base Material SB-6: Biaxially drawn polyamide film (SNR, Mitsubishi Plastics Inc., thickness: 25 μm)

Base Material SB-7: Biaxially drawn polyester film (ON-U, Unitika Ltd., thickness: 25 μm)

Base Material SB-8: Biaxially drawn polyamide film (ON-P, Unitika Ltd., thickness: 25 μm)

Base Material SB-9: Cast polyamide film (Diamiron C, Mitsubishi Plastics Inc., thickness: 25 μm)

Base Material SB-10: Biaxially drawn polyester film (ON, Unitika Ltd., thickness: 15 μm)

Base Material SB-11: Biaxially drawn polyamide film (RX, Kohjin Co., Ltd., thickness: 15 μm)

Base Material SB-12: Biaxially drawn polyester film (ON-P, Unitika Ltd., thickness: 15 μm)

Base Material SB-13: Biaxially drawn polyester film (PET, Unitika Ltd., thickness: 12 μm)

Tensile properties (tensile stress at rupture point y and elasticity to rupture point x) as respectively measured according to JIS-K7127 in the MD direction and TD direction for the aforementioned base materials SB-1 to SB-9 are shown in Table 4. The tensile properties of the base materials SB-10 to SB-12 are the same as the tensile properties of the base materials SB-1, SB-3 and SB-8.

1% as solvent, and adjusting the concentration to 10 mg/m² as the amount of Cr present in the final dry coating.

(Second Adhesive Layer 15)

Adhesive AD-2: Adhesive containing a primary agent composed of a polyester polyol consisting of a hydrogenated

TABLE 4

| Film Base Material | | Tensile stress y (MPa) | Elasticity x (%) | Directivity Tensile stress y | Elasticity x | (1) y ≥ −2x + 460 | (2) y ≥ 200 |
|---|---|---|---|---|---|---|---|
| SB-1 | MD | 230 | 100 | 92 | 100 | X | ○ |
|  | TD | 250 | 100 |  |  | X | ○ |
| SB-2 | MD | 220 | 110 | 73 | 64 | X | ○ |
|  | TD | 300 | 70 |  |  | X | ○ |
| SB-3 | MD | 250 | 120 | 86 | 92 | ○ | ○ |
|  | TD | 290 | 110 |  |  | ○ | ○ |
| SB-4 | MD | 206 | 100 | 75 | 70 | X | ○ |
|  | TD | 275 | 70 |  |  | X | ○ |
| SB-5 | MD | 260 | 120 | 96 | 92 | ○ | ○ |
|  | TD | 270 | 110 |  |  | ○ | ○ |
| SB-6 | MD | 260 | 110 | 87 | 82 | ○ | ○ |
|  | TD | 300 | 90 |  |  | ○ | ○ |
| SB-7 | MD | 230 | 150 | 68 | 57 | ○ | ○ |
|  | TD | 340 | 85 |  |  | ○ | ○ |
| SB-8 | MD | 235 | 150 | 73 | 57 | ○ | ○ |
|  | TD | 320 | 85 |  |  | ○ | ○ |
| SB-9 | MD | 78 | 320 | 99 | 94 | ○ | X |
|  | TD | 79 | 300 |  |  | ○ | X |

Furthermore, directivity in Table 4 indicates the ratio of the smaller value to the larger value for each of the values of tensile stress at the rupture point y and elasticity to the rupture point x in the MD direction and TD direction, respectively, and directivity becomes smaller as the value of this ratio approaches 100.

The base materials SB-3, SB-5 to SB-8, SB-11 and SB-12 are examples of the film base material (A).

(First Adhesive Layer 12)

Adhesive AD-1: Polyurethane-based adhesive incorporating a tolylene diisocyanate adduct-based curing agent in a polyester polyol-based primary agent (Toyo Ink Co., Ltd.)

(Aluminum Foil Layer 13)

Aluminum Foil AL-1: Soft aluminum foil 8079 having a thickness after annealing and degreasing treatment of 40 μm (Toyo Aluminum K.K.)

(Corrosion Prevention Treated Layer 14)

Treatment Agent CL-1: Sodium polyphosphate-stabilized cerium oxide sol adjusted to a solid concentration of 10% by weight using distilled water for the solvent. Amount of phosphate made to be 10 parts by weight based on 100 parts by weight of cerium oxide.

Treatment Agent CL-2: Composition composed of 90% by weight of polyacrylic acid ammonium salt (Toagosei Co., Ltd.) and 10% by weight of acrylic-isopropylenyl oxazoline copolymer (Nippon Shokubai Co., Ltd.) adjusted to a solid concentration of 5% by weight using distilled water for the solvent.

Treatment Agent CL-3: Composition composed of 90% by weight of polyallylamine (Nitto Boseki Co., Ltd.) and 10% by weight of polyglycerol polyglycidyl ether (Nagase Chemtex Corp.) adjusted to a solid concentration of 5% by weight using distilled water for the solvent.

Treatment Agent CL-4: Chemical conversion coating agent prepared by adding chromium fluoride ($CrF_3$) to a water-soluble phenol resin (Sumitomo Bakelite Co., Ltd.), adjusted to a solid concentration of 1% by weight using an aqueous phosphoric acid solution having a concentration of dimer fatty acid and diol (trade name: "SS-051", Mitsui Chemicals Inc.), and a curing agent composed of a mixture of crude tolylene diisocyanate and crude (or polymeric) diphenylmethane diisocyanate or adducts thereof (trade name: "SK-01", Mitsui Chemicals Inc.).

Adhesive Resin AD-3: Modified polyolefin resin obtained by blending an elastomer composed of ethylene-α-olefin copolymer with modified random polypropylene (PP) obtained by graft modification of maleic anhydride to PP (Tm=approx. 135° C.) (Mitsui Chemicals Inc.).

(Sealant Layer 16)

Film SL-1: Multilayer film composed of two types and three layers consisting of random PP, block PP and random PP having a total thickness of 30 μm (Okamoto Co., Ltd.).

[Outer Cover Material Production Method]

Step (I):

The corrosion prevention treated layer 14 was provided on the side of the aluminum foil AL-1 filled with electrolytic solution by microgravure coating. The coated amount was set to 70 mg/m² to 100 mg/m² as the dry coated amount of the treatment agent (coating agent), and baking treatment was carried out in a drying unit at 150° C. to 250° C. corresponding to the type of treatment agent. The final dry coated amount was made to be 70 mg/m² to 100 mg/m² and baking treatment conditions were made to be within the range of 150° C. to 250° C. both in the case the formed corrosion prevention treated layer 14 consisted of a single layer and in the case of multiple layers.

Step (II):

The adhesive AD-1 was coated to a dry coated amount of 4 g/m² to 5 g/m² on the aluminum foil layer 13 provided with the corrosion prevention treated layer 14 on the side opposite from the side of the corrosion prevention treated layer 14 by gravure reverse coating, followed by layering each type of base material shown in Table 5 and laminating. Subsequently, the adhesive AD-1 was cured by carrying out aging treatment and the base material layer 11 was laminated through the first adhesive layer 12.

Step (III):

The outer cover material 1 having a configuration using dry lamination was produced by coating the adhesive AD-2 onto the laminate obtained in step (II) on the side of the corrosion prevention treated layer 14 by gravure reverse coating to a dry coated amount of 4 g/m² to 5 g/m², layering the film SL-1 and laminating, and curing the adhesive AD-2 by carrying out aging treatment to laminate the sealant layer 16 through the second adhesive 15.

The outer cover material 1 having a configuration using thermal lamination was produced by extrusion laminating the adhesive resin AD-3 onto the corrosion prevention treated layer 14 of the laminate obtained in step (II) using an extrusion laminator within a range of 260° C. to 300° C., sandwich laminating with the film SL-1, laminating the sealant layer 16 through the second adhesive layer 15, and subsequently carrying out thermocompression bonding by thermal lamination so that the temperature of the resulting laminate was in the vicinity of the melting point of the sealant layer 16 to securely adhere the corrosion prevention treated layer 14 and the second adhesive layer 15.

(Evaluation of Electrolyte Resistance)

Test pieces prepared by cutting out a strip measuring 100 mm long×15 mm wide from the outer cover materials obtained in each example were immersed in an electrolytic solution prepared by dissolving $LiPF_6$ (lithium hexafluorophosphate) in a mixture of ethylene carbonate, dimethyl carbonate and diethyl carbonate (weight ratio=1:1:1) to a concentration of 1.5 M, followed by evaluating appearance after storing for 24 hours (Evaluation A) or 4 weeks (Evaluation B) at 85° C. Outer cover materials for which there were no problems with appearance were evaluated as "○ (good)", while those in which separation occurred were evaluated as "× (poor)".

Examples 10 to 19 and Comparative Examples 4 to 9

Outer cover materials having the compositions shown in Table 5 were produced according to the production method described above followed by an evaluation of deep-drawing formability and electrolyte resistance.

TABLE 5

| | Composition | | | | | |
|---|---|---|---|---|---|---|
| | Base layer 11 | First adhesive layer 12 | Aluminum foil layer 13 | Corrosion prevention treated layer 14 | Second adhesive layer 15 | Sealant layer 16 |
| Ex. 10 | SB-3 | AD-1 | AL-1 | CL-1/CL-2 | AD-2 | SL-1 |
| Ex. 11 | SB-5 | AD-1 | AL-1 | CL-1/CL-2 | AD-2 | SL-1 |
| Ex. 12 | SB-6 | AD-1 | AL-1 | CL-1/CL-2 | AD-2 | SL-1 |
| Ex. 13 | SB-7 | AD-1 | AL-1 | CL-1/CL-2 | AD-2 | SL-1 |
| Ex. 14 | SB-8 | AD-1 | AL-1 | CL-1/CL-2 | AD-2 | SL-1 |
| Ex. 15 | SB-13/SB-11 | AD-1 | AL-1 | CL-1/CL-2 | AD-2 | SL-1 |
| Ex. 16 | SB-13/SB-12 | AD-1 | AL-1 | CL-1/CL-2 | AD-2 | SL-1 |
| Ex. 17 | SB-13/SB-11 | AD-1 | AL-1 | CL-1/CL-2/CL-3 | AD-3 | SL-1 |
| Ex. 18 | SB-13/SB-12 | AD-1 | AL-1 | CL-1/CL-2/CL-3 | AD-3 | SL-1 |
| Ex. 19 | SB-13/SB-12 | AD-1 | AL-1 | CL-4/CL-3 | AD-3 | SL-1 |
| Comp. Ex. 4 | SB-1 | AD-1 | AL-1 | CL-1/CL-2 | AD-2 | SL-1 |
| Comp. Ex. 5 | SB-2 | AD-1 | AL-1 | CL-1/CL-2 | AD-2 | SL-1 |
| Comp. Ex. 6 | SB-4 | AD-1 | AL-1 | CL-1/CL-2 | AD-2 | SL-1 |
| Comp. Ex. 7 | SB-9 | AD-1 | AL-1 | CL-1/CL-2 | AD-2 | SL-1 |
| Comp. Ex. 8 | SB-13/SB-10 | AD-1 | AL-1 | CL-1/CL-2 | AD-2 | SL-1 |
| Comp. Ex. 9 | SB-13/SB-10 | AD-1 | AL-1 | CL-1/CL-2/CL-3 | AD-3 | SL-1 |

[Evaluation Methods]

(Evaluation of Deep-Drawing Formability)

The resulting outer cover materials were deep drawn with the metal mold 101 exemplified in FIG. 2 followed by evaluation of formability. The metal mold 101 had a female mold 110, a male mold 120 and air cylinders 130, and the dimensions of a die 121 of the male mold 120 consisted of a length $d_1$ of 60 mm and width $d_2$ of 40 mm.

The clamping pressure generated by the air cylinders 130 was 0.5 MPa to 0.8 MPa, and the stroke speed was 5 mm/sec. The draw depth was set to 4.75 mm, 5.00 mm, 5.25 mm, 5.50 mm, 5.75 mm or 6.00 mm, and forming was carried out 100 times in succession for each draw depth. The outer cover materials were evaluated by evaluating those for which the number of non-defectives in which pinholes or cracks had not formed in the outer cover material was 95 to 100 as "A", those for which the number of non-defectives was 90 to 94 as "B" and those in which the number of non-defectives was less 90 that as "C", and evaluating those outer cover materials evaluated as "B" or better for the result of forming at a draw depth of 5.50 mm or less as "○ (good)", and evaluating those evaluated as "C" for the result of forming at a draw depth of 5.50 mm or less as "× (poor)".

Furthermore, in Table 5, "CL-1/CL-2" of the corrosion prevention treated layer 14 refers to first treating the aluminum foil layer AL-1 with treatment agent CL-1 followed by treating with treatment agent CL-2. This applies similarly to the descriptions of other examples of the corrosion prevention treated layer 14. In addition, "SB-13/SB-11" in the substrate layer 11 refers to a base material first obtained by laminating base material SB-13 and base material SB-11 using the same adhesive as adhesive AD-1, wherein the side having the base material SB-11 is on the side of the first adhesive layer 12. This applies similarly to the descriptions of other examples of the base material layer 11.

In Examples 17 to 19 and Comparative Example 9, treatment was carried out with treatment agent CL-3 in order to impart adhesion to the corrosion prevented treated layer 14 and the second adhesive layer 15 with the adhesive resin.

The evaluation results of each example are shown in Table 6.

TABLE 6

| | Forming Depth [mm] | | | | | | Formability | Electrolyte Resistance Evaluation | |
| --- | --- | --- | --- | --- | --- | --- | --- | --- | --- |
| | 4.75 | 5.00 | 5.25 | 5.50 | 5.75 | 6.00 | Evaluation | A | B |
| Ex. 10 | A | A | A | A | B | C | ○ | ○ | Not evaluated |
| Ex. 11 | A | A | A | A | B | C | ○ | ○ | Not evaluated |
| Ex. 12 | A | A | A | A | B | C | ○ | ○ | Not evaluated |
| Ex. 13 | A | A | A | A | B | C | ○ | ○ | Not evaluated |
| Ex. 14 | A | A | A | A | A | B | ○ | ○ | Not evaluated |
| Ex. 15 | A | A | A | B | C | C | ○ | ○ | ○ |
| Ex. 16 | A | A | A | A | B | C | ○ | ○ | ○ |
| Ex. 17 | A | A | A | B | C | C | ○ | ○ | ○ |
| Ex. 18 | A | A | A | A | B | C | ○ | ○ | ○ |
| Ex. 19 | A | A | A | A | B | C | ○ | ○ | ○ |
| Comp. Ex. 4 | A | A | B | C | C | C | X | ○ | Not evaluated |
| Comp. Ex. 5 | A | A | B | C | C | C | X | ○ | Not evaluated |
| Comp. Ex. 6 | A | A | B | C | C | C | X | ○ | Not evaluated |
| Comp. Ex. 7 | C | C | C | C | C | C | X | ○ | Not evaluated |
| Comp. Ex. 8 | A | B | C | C | C | C | X | ○ | ○ |
| Comp. Ex. 9 | A | B | C | C | C | C | X | ○ | ○ |

As shown in Table 6, the outer cover materials of Examples 10 to 14 having the base material layer 11 composed of a single layer film enabled drawing at a deep draw depth of 0.50 mm to 0.75 mm in comparison with the outer cover materials of Comparative Examples 4 to 7 of the same composition with the exception of the base material layer 11. In addition, Examples 10 to 14 indicate that superior deep-drawing formability is obtained regardless of the magnitude of directivity of mechanical properties provided tensile stress at the rupture point y and elasticity to the rupture point x satisfy the aforementioned formulas (1) and (2). On the other hand, even if the aforementioned formula (1) is satisfied, in the case tensile stress at the rupture point y is less than 100, namely in the case the aforementioned formula (2) is not satisfied, adequate deep-drawing formability is not obtained (Comparative Example 7).

In addition, the outer cover materials of Examples 15 to 19, which have the base material layer 11 composed of a laminated film obtained by laminating the film base material (A) and a polyester film having inferior deep-drawing formability, enabled drawing at a deep draw depth of 0.50 mm to 0.75 mm in comparison with the outer cover materials of Comparative Examples 8 and 9 of the same composition with the exception of the base material layer 11. In hybrid vehicle and electric vehicle applications requiring particularly superior long-term reliability, there are cases in which a multilayer film configuration is required in which a polyester film, which is inferior in terms of deep drawing but has superior acid resistance, electrolyte resistance and scratch resistance, is provided on the outer layer of the film base material (A). On the basis of the above results, superior deep-drawing formability was determined to be obtained even in this multilayer film configuration.

In addition, all of the outer cover materials having dry laminated configurations and thermal laminated configurations of Examples 15 to 18 demonstrated superior long-term reliability comparable to Example 19 that underwent chromate treatment in the evaluation of electrolyte resistance.

Examples 20 to 43 and Comparative Examples 10 to 17

The following Examples [5] to [16] and Examples [21] to [32] correspond to Examples 21 to 32, and the following Examples [1] to [4] and Examples [17] to [20] correspond to Comparative Examples 10 to 17

[Materials Used]
The materials used in the present examples are as indicated below.
<Base Material Layer (SB)>
Film SB-1: Biaxially drawn polyamide film (A1) (thickness: 25 μm)
Film SB-2: Biaxially drawn polyamide film (A2) (thickness: 25 μm)
Film SB-3: Biaxially drawn polyamide film (A3) (thickness: 25 μm)
Film SB-4: Biaxially drawn polyamide film (A4) (thickness: 25 μm)
Film SB-5: Biaxially drawn polyamide film (A1) (thickness: 15 μm) and PET film (thickness: 12 μm) laminated by dry lamination using adhesive AD-1 to be subsequently described (3 g/cm$^2$ to 7 g/cm$^2$)
Film SB-6: Biaxially drawn polyamide film (A2) (thickness: 15 μm) and PET film (thickness: 12 μm) laminated by dry lamination using adhesive AD-1 to be subsequently described (3 g/cm$^2$ to 7 g/cm$^2$)
Film SB-7: Biaxially drawn polyamide film (A3) (thickness: 15 μm) and PET film (thickness: 12 μm) laminated by dry lamination using adhesive AD-1 to be subsequently described (3 g/cm$^2$ to 7 g/cm$^2$)
Film SB-8: Biaxially drawn polyamide film (A4) (thickness: 15 μm) and PET film (thickness: 12 μm) laminated by dry lamination using adhesive AD-1 to be subsequently described (3 g/cm$^2$ to 7 g/cm$^2$)

The surface free energy 7 of the aforementioned biaxially drawn polyamide films (A1) to (A4) along with their dispersive components γd and the ratio γd/γ (units: %) are shown in Table 7. The method used to calculate these parameters is indicated below. Furthermore, calculations were made using the "Find Minimum" command of the "Mathematica" numerical computation software.

(Calculation Method)

The surface free energy γ and dispersive component thereof of each film were calculated from the following equations (1) and (2) using three types of liquids consisting of water, methylene iodide and α-bromonaphthalene, for which surface free energy and each component thereof (dispersion force, polar force and hydrogen bonding strength) are known, measuring contact angle at the film surface under conditions of 20° C. and 50% RH, and introducing according to the extended Fowke's equation and Young's equation.

$$(\gamma d \cdot \gamma_s d)^{1/2} + (\gamma p \cdot \gamma_s p)^{1/2} + (\gamma h \cdot \gamma_s h)^{1/2} = \gamma_s (1 + \cos \theta)/2 \quad (1)$$

$$\gamma = \gamma d + \gamma p + \gamma h \quad (2)$$

In the aforementioned equations, $\gamma_s$, $\gamma_s d$, $\gamma_s p$ and $\gamma_s h$ (units: mN/m) represent surface free energy of the measured liquids along with each of the components of dispersion force, polar force and hydrogen bonding strength thereof. γ, γd, γp and γh (units: mN/m) represent surface free energy on the measured surface of the film along with each of the components of dispersion force, polar force and hydrogen bonding strength thereof. In addition, θ represents the contact angle of a measured liquid on the measured surface. The contact angle θ is measured at five locations on the same measured surface followed by determination of the average value thereof.

TABLE 7

| | Surface Free Energy | | | |
|---|---|---|---|---|
| Film | γ (mN/m) | Dispersion component γd (mN/m) | Ratio γd/γ (%) | Contact Angle (BN) (°) |
| A1 | 49.7 | 42.1 | 84.7 | 15.6 |
| A2 | 45.2 | 35.8 | 79.2 | 33.6 |
| A3 | 45.6 | 35.9 | 78.7 | 33.2 |
| A4 | 49.9 | 39.0 | 78.2 | 25.9 |

Contact angle (BN) in Table 7 refers to the contact angle when α-bromonaphthalene was dropped onto the film surface.

<First Adhesive Layer (AD-1)>

Adhesive AD-1: Polyurethane-based adhesive incorporating a tolylene diisocyanate adduct-based curing agent in a polyester polyol-based primary agent (Toyo Ink Co., Ltd.)

<Aluminum Foil Layer (AL)>

Aluminum Foil AL-1: Soft aluminum foil 8079 having a thickness after annealing and degreasing treatment of 40 μm (Toyo Aluminum K.K.)

<Corrosion Prevention Treated Layer (CL)>

Treatment Agent CL-1: Sodium polyphosphate-stabilized cerium oxide sol adjusted to a solid concentration of 10% by weight using distilled water for the solvent. Amount of phosphate made to be 10 parts by weight based on 100 parts by weight of cerium oxide.

Treatment Agent CL-2: Composition composed of 90% by weight of polyacrylic acid ammonium salt (Toagosei Co., Ltd.) and 10% by weight of acrylic-isopropylenyl oxazoline copolymer (Nippon Shokubai Co., Ltd.) adjusted to a solid concentration of 5% by weight using distilled water for the solvent.

Treatment Agent CL-3: Composition composed of 90% by weight of polyallylamine (Nitto Boseki Co., Ltd.) and 10% by weight of polyglycerol polyglycidyl ether (Nagase Chemtex Corp.) adjusted to a solid concentration of 5% by weight using distilled water for the solvent.

Treatment Agent CL-4: Chemical conversion coating agent prepared by adding chromium fluoride ($CrF_3$) to a water-soluble phenol resin (Sumitomo Bakelite Co., Ltd.), adjusted to a solid concentration of 1% by weight using an aqueous phosphoric acid solution having a concentration of 1% as solvent, and adjusting the concentration to 10 mg/m² as the amount of Cr present in the final dry coating.

<Second Adhesive Layer (AD-2)>

Adhesive AD-21: Adhesive containing a primary agent composed of a polyester polyol consisting of a hydrogenated dimer fatty acid and diol (trade name: "SS-051", Mitsui Chemicals Inc.), and a curing agent composed of a mixture of crude tolylene diisocyanate and crude (or polymeric) diphenylmethane diisocyanate or adducts thereof (trade name: "SK-01", Mitsui Chemicals Inc.).

Adhesive Resin AD-22: Modified polyolefin resin obtained by blending an elastomer composed of ethylene-α-olefin copolymer with modified random polypropylene (PP) serving as base resin obtained by graft modification of maleic anhydride to PP (Tm(AR)=approx. 135° C.) (Mitsui Chemicals Inc.).

<Sealant Layer (SL)>

Film SL-1: Multilayer film composed of two types and three layers consisting of random PP, block PP and random PP having a total thickness of 30 μm (Okamoto Co., Ltd.).

<Slipping Agent>

Slipping Agent F-1: Erucic amide

[Outer Cover Material Production Method]

Step (I):

The corrosion prevention treated layer (CL) was provided on the side of the aluminum foil AL-1 filled with electrolytic solution by microgravure coating. The coated amount was set to 0.010 mg/m² to 100 mg/m² as the dry coated amount of the treatment agent (coating agent), and baking treatment was carried out in a drying unit at 150° C. to 200° C. corresponding to the type of treatment agent. The final dry coated amount was made to be 0.010 mg/m² to 100 mg/m² and baking treatment conditions were made to be within the range of 150° C. to 200° C. both in the case the formed corrosion prevention treated layer (CL) consisted of a single layer and in the case of multiple layers.

Step (II):

The adhesive AD-1 was coated to a dry coated amount of 3 g/m² to 7 g/m² on the aluminum foil layer (AL) provided with the corrosion prevention treated layer (CL) on the side opposite from the side of the corrosion prevention treated layer (CL) by gravure reverse coating, followed by layering each type of base material in the configurations shown in Table 8 and laminating. Subsequently, the adhesive AD-1 was cured by carrying out aging treatment and the base material layer (SB) was laminated through the first adhesive layer (AD-1).

Step (III):

The outer cover material having a configuration using dry lamination was produced by coating the adhesive AD-21 onto the laminate obtained in step (II) on the side of the corrosion prevention treated layer (CL) by gravure reverse coating to a dry coated amount of 3 g/m² to 7 g/m², layering the film SL-1 and laminating, and curing the adhesive AD-21 by carrying out aging treatment to laminate the sealant layer (SL) through the second adhesive (AD-2).

In addition, the outer cover material having a configuration using thermal lamination was produced by extrusion laminating the adhesive resin AD-22 onto the corrosion prevention treated layer (CL) of the laminate obtained in step (II) using an extrusion laminator, sandwich laminating with the film SL-1, laminating the sealant layer (SL) through the second adhesive layer (AD-2), and subsequently carrying out thermocompression bonding by thermal lamination under conditions of 210° C. and 5 m/min so that the temperature of the resulting laminate was in the vicinity of the melting point of the sealant layer (SL) to securely adhere the corrosion prevention treated layer (CL) and the second adhesive layer (AD-2).

In addition, erucic amide dissolved with isopropyl alcohol (concentration: 1% by weight) was coated on the surfaces of the base material layer (SB) and sealant layer (SL) for each of the configurations.

[Evaluation of Moldability]

Deep drawing was carried out with the metal mold indicated below on samples (150 mm×200 mm) cut out from the outer cover materials obtained in each example, and moldability was evaluated based on the following criteria.

Metal mold size: 252 mm×125 mm
Molding size: 70 mm×80 mm
Punch/Dice vertical R: 1.00 mm
Metal mold clearance: 0.34 mm
Molding speed: 300 ram/min
Film clamping pressure: 0.8 MPa (Evaluation Criteria)

○: Deep-drawing of draw depth of 6 mm or more without the occurrence of cracks or pinholes ×: Draw depth of less than 6 mm and occurrence of cracks and pinholes The results of evaluating moldability are shown in Tables 8 and 9. Furthermore, in Tables 8 and 9, "CL-1/CL-2" refers to first treating the aluminum foil layer AL-1 with treatment agent CL-1 followed by treating with treatment agent CL-2. This applies similarly to the descriptions of other examples of the corrosion prevention treated layer (CL). In addition, films (SB-5) to (SB-8) were all laminated with a PET film on the uppermost surface.

TABLE 8

| | Base Material Layer | First Adhesive Layer | Aluminum Foil Layer | Corrosion Prevention Treated Layer | Second Adhesive Layer | Sealant Layer | Moldable Depth (mm) | Evaluation |
|---|---|---|---|---|---|---|---|---|
| Ex. [1] | SB-1 | AD-1 | AL-1 | CL-1/CL-2 | AD-2 | SL-1 | 5.4 | X |
| Ex. [2] | SB-1 | | | CL-4 | AD-2 | | 5.4 | X |
| Ex. [3] | SB-1 | | | CL-1/CL-2/CL-3 | AD-3 | | 5.4 | X |
| Ex. [4] | SB-1 | | | CL-4 | AD-3 | | 5.6 | X |
| Ex. [5] | SB-2 | | | CL-1/CL-2 | AD-2 | | 6.4 | ○ |
| Ex. [6] | SB-2 | | | CL-4 | AD-2 | | 6.4 | ○ |
| Ex. [7] | SB-2 | | | CL-1/CL-2/CL-3 | AD-3 | | 6.6 | ○ |
| Ex. [8] | SB-2 | | | CL-4 | AD-3 | | 6.4 | ○ |
| Ex. [9] | SB-3 | | | CL-1/CL-2 | AD-2 | | 6.6 | ○ |
| Ex. [10] | SB-3 | | | CL-4 | AD-2 | | 6.4 | ○ |
| Ex. [11] | SB-3 | | | CL-1/CL-2/CL-3 | AD-3 | | 6.6 | ○ |
| Ex. [12] | SB-3 | | | CL-4 | AD-3 | | 5.6 | ○ |
| Ex. [13] | SB-4 | | | CL-1/CL-2 | AD-2 | | 6.8 | ○ |
| Ex. [14] | SB-4 | | | CL-4 | AD-2 | | 6.8 | ○ |
| Ex. [15] | SB-4 | | | CL-1/CL-2/CL-3 | AD-3 | | 6.8 | ○ |
| Ex. [16] | SB-4 | | | CL-4 | AD-3 | | 6.6 | ○ |

TABLE 9

| | Base Material Layer | First Adhesive Layer | Aluminum Foil Layer | Corrosion Prevention Treated Layer | Second Adhesive Layer | Sealant Layer | Moldable Depth (mm) | Evaluation |
|---|---|---|---|---|---|---|---|---|
| Ex. [17] | SB-5 | AD-1 | AL-1 | CL-1/CL-2 | AD-2 | SL-1 | 5.2 | X |
| Ex. [18] | SB-5 | | | CL-4 | AD-2 | | 5.0 | X |
| Ex. [19] | SB-5 | | | CL-1/CL-2/CL-3 | AD-3 | | 5.2 | X |
| Ex. [20] | SB-5 | | | CL-4 | AD-3 | | 5.2 | X |
| Ex. [21] | SB-6 | | | CL-1/CL-2 | AD-2 | | 6.2 | ○ |
| Ex. [22] | SB-6 | | | CL-4 | AD-2 | | 6.0 | ○ |
| Ex. [23] | SB-6 | | | CL-1/CL-2/CL-3 | AD-3 | | 6.0 | ○ |
| Ex. [24] | SB-6 | | | CL-4 | AD-3 | | 6.2 | ○ |
| Ex. [25] | SB-7 | | | CL-1/CL-2 | AD-2 | | 6.2 | ○ |
| Ex. [26] | SB-7 | | | CL-4 | AD-2 | | 6.2 | ○ |
| Ex. [27] | SB-7 | | | CL-1/CL-2/CL-3 | AD-3 | | 6.2 | ○ |
| Ex. [28] | SB-7 | | | CL-4 | AD-3 | | 6.2 | ○ |
| Ex. [29] | SB-8 | | | CL-1/CL-2 | AD-2 | | 6.4 | ○ |
| Ex. [30] | SB-8 | | | CL-4 | AD-2 | | 6.4 | ○ |
| Ex. [31] | SB-8 | | | CL-1/CL-2/CL-3 | AD-3 | | 6.4 | ○ |
| Ex. [32] | SB-8 | | | CL-4 | AD-3 | | 6.2 | ○ |

The outer cover materials of Examples [5] to [16] and Examples [21] to [32] (Examples 20 to 43), in which the base material layer has a biaxially drawn polyamide film having a ratio γd/γ of 80% or less, demonstrated superior moldability in comparison with the outer cover materials of Examples [1] to [4] and Examples [17] to [20] (Comparative Examples 10 to 17), in which the base material layer has a biaxially drawn polyamide film having a ratio γd/γ of greater than 80%.

INDUSTRIAL APPLICABILITY

The lithium ion battery outer cover material of the present invention has superior deep-drawing formability, and even in cases of desiring to increase energy density for the purpose of extracting a large amount of current as in electric vehicles and the like, a deep drawn formed product of favorable quality can be obtained without the formation of cracks or pinholes. In addition, the lithium ion battery outer cover material of the present invention is also advantageous in terms of being able to achieve superior electrolyte resistance even in cases of not being subjected to chromate treatment or other chemical conversion treatment.

BRIEF DESCRIPTION OF THE REFERENCE SYMBOLS 1, 10 Lithium ion battery outer cover material
11 Base material layer (SB)
12 First adhesive layer (AD-1)
13 Aluminum foil layer (AL)
14 Corrosion prevention treated layer (CL)
15 Second adhesive layer (AD-2)
16 Sealant layer (SL)

The invention claimed is:

1. A lithium ion battery outer cover material, comprising: sequentially laminating onto one side of a base material layer (SB) a first adhesive layer (AD-1) containing an adhesive, an aluminum foil layer (AL) provided with a corrosion prevention treated layer (CL) on at least one side thereof, a second adhesive layer (AD-2) containing an adhesive or adhesive resin, and a sealant layer (SL); wherein,
the base material layer (SB) has a film base material (A) as indicated below:
film base material (A): film base material in which the difference ($\alpha 2-\alpha 1$) between elasticity to the yield point ($\alpha 1$) and elasticity to the rupture point ($\alpha 2$) as measured according to JIS-K7127 is 100% or more in at least one of the MD direction and TD direction.

2. The lithium ion battery outer cover material according to claim 1, wherein stress at the rupture point of the film base material (A) as measured according to JIS-K7127 is 100 MPa or more.

3. The lithium ion battery outer cover material according to claim 2, wherein the film base material (A) is a biaxially drawn film base material composed of a resin composition (a1), obtained by blending an ethylene-based copolymer resin obtained by copolymerizing maleic anhydride with a polyamide resin, or a resin composition (a2), obtained by blending an aliphatic polyester with a polyamide resin.

4. The lithium ion battery outer cover material according to claim 1, wherein the film base material (A) is a biaxially drawn film base material composed of a resin composition (a1), obtained by blending an ethylene-based copolymer resin obtained by copolymerizing maleic anhydride with a polyamide resin, or a resin composition (a2), obtained by blending an aliphatic polyester with a polyamide resin.

5. The lithium ion battery outer cover material according to claim 4, wherein the ethylene-based copolymer obtained by copolymerizing maleic anhydride is an ethylene-α,β-unsaturated carboxylic acid alkyl ester-maleic anhydride copolymer.

6. The lithium ion battery outer cover material according to claim 5, wherein the polyamide resin is Nylon 6 or Nylon 66.

7. The lithium ion battery outer cover material according to claim 4, wherein the aliphatic polyester is polycaprolactone.

8. The lithium ion battery outer cover material according to claim 7, wherein the polyamide resin is Nylon 6 or Nylon 66.

9. The lithium ion battery outer cover material according to claim 4, wherein the polyamide resin is Nylon 6 or Nylon 66.

10. A lithium ion battery outer cover material, comprising:
sequentially laminating on one side of a base material layer (SB) a first adhesive layer (AD-1) containing an adhesive, an aluminum foil layer (AL) provided with a corrosion prevention treated layer (CL) on at least one side thereof, a second adhesive layer (AD-2) containing an adhesive or adhesive resin, and a sealant layer (SL); wherein,
the base material layer (SB) has a film base material (A) as indicated below:
film base material (A): drawn polyamide film base material in which elasticity to the rupture point x (units: %) and tensile stress at the rupture point y (units: MPa) as measured according to JIS-K7127 satisfy the relationships represented by the following formulas (1) and (2).

$$y \geq -2x+460 \quad (1)$$

$$y \geq 200 \quad (2).$$

11. A lithium ion battery outer cover material, comprising:
sequentially laminating on at least one side of a base material layer (SB) a first adhesive layer (AD-1) formed by an adhesive, an aluminum foil layer (AL) provided with a corrosion prevention treated layer (CL) on at least one side thereof, a second adhesive layer (AD-2) formed by an adhesive resin or adhesive, and a sealant layer (SL); wherein,
the base material layer (SB) is a drawn polyamide film in which the ratio γd/γ of a dispersive component of surface free energy γd to surface free energy γ is 80% or less.

12. The lithium ion battery outer cover material according to claim 11, wherein the dispersive component of surface free energy γd of the drawn polyamide film is 40 mN/m or less.

13. The lithium ion battery outer cover material according to claim 12, wherein the contact angle when α-bromonaphthalene is dropped onto the surface of the drawn polyamide film is 20° or more.

14. The lithium ion battery outer cover material according to claim 12, wherein the drawn polyamide film is a biaxially drawn polyamide film.

15. The lithium ion battery outer cover material according to claim 11, wherein the contact angle when α-bromonaphthalene is dropped onto the surface of the drawn polyamide film is 20° or more.

16. The lithium ion battery outer cover material according to claim 15, wherein the drawn polyamide film is a biaxially drawn polyamide film.

17. The lithium ion battery outer cover material according to claim 11, wherein the drawn polyamide film is a biaxially drawn polyamide film.

* * * * *

UNITED STATES PATENT AND TRADEMARK OFFICE
CERTIFICATE OF CORRECTION

PATENT NO.         : 8,920,959 B2
APPLICATION NO.    : 13/818135
DATED              : December 30, 2014
INVENTOR(S)        : Suzuta et al.

Page 1 of 1

It is certified that error appears in the above-identified patent and that said Letters Patent is hereby corrected as shown below:

On the Title Page

Column 2, Item [56] (Other Publications), line 2, delete "2013-202756 X." and insert
-- 2013-202756. --

Signed and Sealed this
Twenty-third Day of June, 2015

Michelle K. Lee
*Director of the United States Patent and Trademark Office*